(12) United States Patent
Zeller et al.

(10) Patent No.: US 11,700,857 B2
(45) Date of Patent: *Jul. 18, 2023

(54) ALGAE-DERIVED FLEXIBLE FOAM, AND A METHOD OF MANUFACTURING THE SAME

(71) Applicant: Bloom Holdings, LLC, Meridian, MS (US)

(72) Inventors: Mark Ashton Zeller, Meridian, MS (US); Ryan Hunt, Meridian, MS (US); Robert Falken, Oceanside, CA (US)

(73) Assignee: Bloom Holdings, LLC, Meridian, MS (US)

( * ) Notice: Subject to any disclaimer, the term of this patent is extended or adjusted under 35 U.S.C. 154(b) by 615 days.

This patent is subject to a terminal disclaimer.

(21) Appl. No.: 15/356,213

(22) Filed: Nov. 18, 2016

(65) Prior Publication Data

US 2017/0142978 A1 May 25, 2017

Related U.S. Application Data

(60) Provisional application No. 62/257,422, filed on Nov. 19, 2015.

(51) Int. Cl.

| | | |
|---|---|---|
| A01N 65/03 | (2009.01) | |
| A43B 1/00 | (2006.01) | |
| A43B 1/02 | (2022.01) | |
| A43B 13/04 | (2006.01) | |
| A43B 17/00 | (2006.01) | |
| A43B 17/10 | (2006.01) | |
| A43B 17/14 | (2006.01) | |

(Continued)

(52) U.S. Cl.
CPC ............... *A01N 65/03* (2013.01); *A43B 1/00* (2013.01); *C08J 9/0023* (2013.01); *C08J 9/0033* (2013.01); *C08J 9/0061* (2013.01); *D01F 1/103* (2013.01); *D03D 17/00* (2013.01); *D06M 15/03* (2013.01); *D06M 16/00* (2013.01); *D06M 23/08* (2013.01); *A43B 1/0045* (2013.01); *A43B 1/02* (2013.01); *A43B 5/0486* (2013.01); *A43B 13/04* (2013.01); *A43B 17/006* (2013.01); *A43B 17/10* (2013.01); *A43B 17/14* (2013.01); *C08J 9/0066* (2013.01); *C08J 2201/024* (2013.01); *C08J 2201/026* (2013.01); *C08J 2201/03* (2013.01); *C08J 2205/05* (2013.01); *C08J 2205/052* (2013.01); *C08J 2205/06* (2013.01); *C08J 2205/10* (2013.01); *C08J 2323/08* (2013.01); *C08J 2331/04* (2013.01); *C08J 2375/04* (2013.01); *C08J 2405/00* (2013.01); *D01D 5/08* (2013.01); *D06M 2101/06* (2013.01); *D06M 2400/01* (2013.01); *D06P 1/48* (2013.01); *D10B 2201/01* (2013.01); *D10B 2331/10* (2013.01); *D10B 2401/10* (2013.01)

(58) Field of Classification Search
CPC ...... C08J 9/066; C08J 2305/04; C08J 9/0066; A01N 65/03; A43B 1/00; D06M 23/08
See application file for complete search history.

(56) References Cited

U.S. PATENT DOCUMENTS

| | | |
|---|---|---|
| 3,530,489 A | 9/1970 | Appleton |
| 3,812,225 A | 5/1974 | Hosoda et al. |

(Continued)

FOREIGN PATENT DOCUMENTS

| | | |
|---|---|---|
| CN | 102321375 A | 1/2012 |
| CN | 102504722 A | 6/2012 |

(Continued)

OTHER PUBLICATIONS

English language abstract of CN 102504398 to Hao et al. obtained from European Patent Office (Year: 2019).*

(Continued)

*Primary Examiner* — Melissa A Rioja

(74) *Attorney, Agent, or Firm* — Foster Swift Collins & Swift PC; Mikhail Murshak

(57) ABSTRACT

This document presents algae-derived antimicrobial fiber substrates, and a method of making the same. The fiber may be a synthetic fiber, but can also be formed as a cellulosic (e.g., cotton). In various implementations, an algae-derived antimicrobial fiber substrate can be made to have identical properties and characteristics of nylon-6 of nylon 6-6 polymer or the like, and yet contain antimicrobial, anti-viral, and/or flame retardant algal derived substances. Any of various species of red algae, brown algae, blue-green algae, and brown seaweed (marine microalgae and/or macroalgae) are known to contain a high level of sulfated polysaccharides with inherent antimicrobial, antiviral, and flame-retardant properties, and can be used as described herein. Additionally disclosed are algae-derived flexible foams, whether open-cell or closed-cell, with inherent antimicrobial, antiviral, and flame resistant properties. Further, a process of manufacturing is presented wherein the process may include one or more of the steps of: harvesting algae-biomass; sufficiently drying the algae biomass; blending the dried algae biomass with a carrier resin and various foaming ingredients; adding an algal-derived antimicrobial compound selected from various natural sulfated polysaccharides present in brown algae, red algae, and/or certain seaweeds (marine microalgae); and adding a sufficient quantity of dried algae biomass to the formulation to adequately create a fire resistant flexible foam material.

15 Claims, 6 Drawing Sheets

(51) Int. Cl.
*A43B 5/04* (2006.01)
*C08J 9/00* (2006.01)
*D01D 5/08* (2006.01)
*D01F 1/10* (2006.01)
*D06M 15/03* (2006.01)
*D06M 16/00* (2006.01)
*D06M 23/08* (2006.01)
*D06P 1/48* (2006.01)
*D03D 17/00* (2006.01)
*D06M 101/06* (2006.01)

(56) References Cited

U.S. PATENT DOCUMENTS

| | | | |
|---|---|---|---|
| 4,252,656 A | 2/1981 | Liebowitz et al. | |
| 4,317,889 A | 3/1982 | Pcolinsky, Jr. | |
| 4,331,779 A | 5/1982 | Park | |
| 4,347,326 A | 8/1982 | Iwami et al. | |
| 5,352,709 A | 10/1994 | Tarrant et al. | |
| 5,430,960 A | 7/1995 | Richardson | |
| 5,503,844 A | 4/1996 | Kwiatek et al. | |
| 5,779,960 A * | 7/1998 | Berlowitz-Tarrant | C08J 9/00 264/176.1 |
| 6,013,689 A | 1/2000 | Rader | |
| 6,391,933 B1 | 5/2002 | Mattesky | |
| 6,479,444 B1 | 11/2002 | Porticos et al. | |
| 8,183,167 B1 | 5/2012 | Delattre et al. | |
| 8,551,235 B2 | 10/2013 | Mahan et al. | |
| 2002/0018884 A1 | 2/2002 | Thomson | |
| 2005/0042437 A1* | 2/2005 | Ramesh | C08J 9/0066 428/304.4 |
| 2009/0038053 A1 | 2/2009 | Merovitz | |
| 2009/0047329 A1 | 2/2009 | Stucky et al. | |
| 2010/0272940 A1* | 10/2010 | Shi | B29C 45/0001 428/36.92 |
| 2010/0305227 A1 | 12/2010 | Parker et al. | |
| 2011/0054058 A1 | 3/2011 | Crooker et al. | |
| 2011/0095225 A1 | 4/2011 | Eckelberry et al. | |
| 2011/0217249 A1 | 9/2011 | Dreher | |
| 2014/0272357 A1 | 9/2014 | He et al. | |
| 2014/0273169 A1* | 9/2014 | Scheer | C08L 23/12 435/257.1 |
| 2017/0066893 A1 | 3/2017 | Falken | |

FOREIGN PATENT DOCUMENTS

| | | |
|---|---|---|
| CN | 103601933 A | 2/2014 |
| RU | 2014 117 380 A | 12/2015 |
| WO | WO-2013/053189 A1 | 4/2013 |

OTHER PUBLICATIONS

Machine translation of CN 102504398 to Hao et al. obtained from European Patent Office (Year: 2019).*

Mesh Vs. Micron Comparison Chart published byNetafim USA (Year: 2019).*

"This Week's Opportunity for Change: Running Shoes." *Bloom*, Sep. 16, 2015. http://bloomfoam.com/opportunity-for-change-running-shoes/. Retrieved from Internet. Accessed on Jan. 13, 2017. 6 pages.

Johnson et al., 'Filamentous Green Algae Additions to Isocyanate Based Foams, Journal of Applied Polymer Science', Apr. 16, 2004, vol. 93 pp. 2469-2477, Abstract, Introduction.

"Oshenite™: Material Safety Data Sheet—Mar. 5, 2010." *US Argaonite Enterprises*, 2010. Web. [retrieved Feb. 15, 2017]. 5 pages. https://www.usaragonite.com/docs/Oshenite_MSDS.pdf.

Anbuchezhian, Ramasamy, et al. "Prospect of Marine Algae for Production of Industrially Important Chemicals." *Algal Biorefinery: An Integrated Approach*, edited by Debabrata Das, 2015, Chapter 9. pp. 195-217.

Jin, Gyuhyun, and Geun Hyung Kim. "Rapid-prototyped PCL/fucodian Composite Scaffolds for Bone Tissue Regeneration: Design, Fabrication, and Physical/Biological Properties." *Journal of Materials Chemistry*, vol. 21, 2011, pp. 17710-17718.

* cited by examiner

ALGAE-DERIVED FLEXIBLE FOAM, AND A METHOD OF MANUFACTURING THE SAME

CROSS-REFERENCE TO RELATED APPLICATIONS

This application claims priority to and the benefit of U.S. Provisional Patent Application No. 62/257,422, titled "ALGAE-DERIVED ANTIMICROBIAL FIBER SUBSTANCES, AND A METHOD OF MANUFACTURING THE SAME," and filed on Nov. 19, 2015, the disclosure of which is incorporated herein by reference in its entirety for all purposes.

BACKGROUND

It is a longstanding requirement of industry, such as in the textile industry, that fabrics and/or products, which may be comprised of such textiles, exhibit antimicrobial, antifungal, antibacterial, antiviral, and/or anti-inflammatory characteristics and performance. Using metallic particles as antimicrobial and antifungal agents is known, but success, especially with respect to textiles and textile containing products, has been challenging due to clumping and other issues in obtaining a controlled, uniform dispersion and concentration of the particles in the final textile product. Other challenges are faced with respect to producing other products of manufacture, including: high material cost, oxidation during use, limited global supply, as well as significant concerns regarding the potential negative health and environmental consequences from their use. Further, there are adverse health and environmental consequences to using metallic particles in textiles. Additionally, it is known that with respect to foamable materials, such foamable materials may not be ideal for environmentally friendly and sustainable living. For these reasons, there exists a continuing and unmet need for improved antifungal, antibacterial, and/or antiviral, properties and characteristics derived from renewable non-metallic natural sources. Anti-inflammatory products derived from such renewable and natural sources are also desirable.

SUMMARY

In one aspect, the present disclosure is directed to a process for producing a foamed material so as to produce various flexible and/or rigid foamable compositions from one or more of an algae biomass, copolymer carrier resins, and/or other foaming ingredients. In part, this document presents sulfated polysaccharides derived from renewable non-terrestrial plants exhibiting exceptional antimicrobial, antifungal, antibacterial, antiviral, and/or antiinflammatory properties and characteristics. In some instances, the materials disclosed herein are derived, at least in part, from aquatic organisms, including shell fish, algae, cyanobacteria, and/or the like.

The compositions of the disclosure may be employed in many uses, such as for use, for example, in cushions for furniture, upholstery, footwear components, yoga mats, medical devices, flame resistant articles of manufacture, including textiles, automotive components, carpets and carpet-padding applications, and other suitable uses. For instance, in certain instances, this document presents algae-derived fibers, and more particularly algae-derived fibers and fabrics exhibiting anti-microbial properties and characteristics.

Specifically, in another aspect, this document presents algae-derived rigid and/or flexible foam materials, as well as the methods of making and using the same. For instance, in various aspects, algae derived powders and solutions are suitable parts of the feedstock for producing such foams, such as for making flexible or rigid foams having beneficial conditions and/or properties due the inclusion of the aforementioned algae components. Additionally, algae offer many environmental benefits for use in manufacturing polyurethane and/or ethylene-vinyl acetate foams, such as by being antimicrobial, antifungal, antibacterial, antiviral, and/or anti-inflammatory, while at the same time being derived at least in part from algae obtained from waste streams, and requiring no pesticides to grow, sequestering C02, and by virtue of their removal from waterways, creating beneficial water remediation.

Particularly, in one embodiment, an algae-derived foam composition for use in the production of an article of manufacture is provided. The algae-derived foam composition may include from about 10% to about 25% dried algae biomass by weight to about 75% to about 90% foam material by weight. For instance, in certain embodiments, the foam material may be an open-celled or closed-cell foam material, such as a polyurethane and/or an ethylene-vinyl acetate foam. Additionally, in particular embodiments, the algae derived foam composition may include one or more other components, such as about 1% to about 5% fucoidan powder, from about 2% to about 10% carbonate, from about 2% to about 10% peroxide, from about 2% to about 10% azodicarbamide, from about 0.1% to about 1% stearate, and/or from about 0.1% to about 1% oxide. In particular embodiments, the algae derived foam composition may include from about 0.01% to about 40%, such as from about 1% or 5% to about 30% to about 35%, for instance, from about 10% or about 15% to about 25% to about 30%, including about 20% Oolitic Argonite. More particularly, in various instances, the amount of Oolitic Argonite to be added can result in a decrease in the amount of the algae derived and/or fucoidan powder to be added. In certain instances, the Oolitic Argonite component may replace the algae derived and/or fucoidan component, and in other instances, it may be added in a manner so as to be synergistic therewith. Additionally, in certain instances, the Oolitic Argonite component may replace the carbonate, e.g., calcium carbonate, component, and in other instances, it may be added in a manner so as to be synergistic therewith.

Additionally, in another aspect, a method for making an algae-derived polyurethane copolymer foam is provided. In certain instances, the method may include reacting a polyisocyanate with a polyol, such as in the presence of fucoidan powder. In certain instances, the method may include curing the reaction product with a catalytic amount of a catalyst that causes pore formation in the cured product. In some instances, the polyol may include a low amount of cross-linking so as to form a flexible polyurethane foam or a rigid polyurethane foam. In certain implementations, the polyurethane foam may be configured for use in the manufacture of furniture. In other instances, the polyurethane foam is flame retardant. In further embodiments, the polyurethane foam may be configured for use in the manufacture of an insole of a shoe.

Accordingly, in one aspect, an algae derived shoe insole is provided, such as where the insole is configured for being inserted within a shoe and thereby providing cushioning and/or support to the shoe. In certain embodiments, the insole may include a polyurethane foam having from 1% to about 25% algae biomass by weight. In various instances, the insole may be composed of a plurality of layers including a base layer and a cushioning layer, such as where the cushioning layer of the polyurethane foam includes from about 1% to about 25% algae biomass. In particular embodiments, the insole further includes a support member such as a support member being coupled to the base layer at one or more of an arch contacting or heel contacting portion.

Hence, in general, in one aspect, a process of manufacturing algae-derived flexible and/or rigid foams is provided. The method may be implemented so as to derive an open-cell or closed-cell foam, such as where the foam has inherent antimicrobial and/or flame resistant properties. In certain instances, the method may include one or more of the steps of harvesting algae-biomass, sufficiently drying the algae biomass, blending the dried algae biomass with a carrier resin, e.g., a copolymer carrier resins, and various foaming ingredients. In a subsequent step, the method may include adding an algal-derived antimicrobial compound selected from various natural sulfated polysaccharides present in brown algae, red algae, and/or certain seaweeds (marine microalgae). The method further may include adding a sufficient quantity of dried algae biomass to the formulation to adequately create an antimicrobial, antifungal, antibacterial, antiviral, and/or anti-inflammatory foam material. In particular embodiments, the foam material may be used in the production of antimicrobial, antibacterial, and/or antiviral footwear components, yoga mats, medical devices, and/or flame resistant articles of manufacture, and other suitable uses.

In another aspect, this document presents an algae-derived antimicrobial fiber substrates, and a method of making the same. The fiber may be a natural or a synthetic fiber, but can also be formed as a cellulosic (e.g., cotton). In various implementations, an algae-derived antimicrobial fiber substrate can be made to have identical properties and characteristics of nylon-6 of nylon 6-6 polymer or the like, and yet contain antimicrobial substances. Any of various species of red algae, brown algae, and brown seaweed (marine microalgae and/or macroalgae) are known to contain a high level of sulfated polysaccharides with inherent antimicrobial properties, and can be used in various implementations of the subject matter described herein.

The details of one or more embodiments are set forth in the accompanying drawings and the description below. Other features and advantages will be apparent from the description and drawings, and from the claims.

BRIEF DESCRIPTION OF THE DRAWINGS

These and other aspects will now be described in detail with reference to the following drawings.

DETAILED DESCRIPTION

Figure 1:
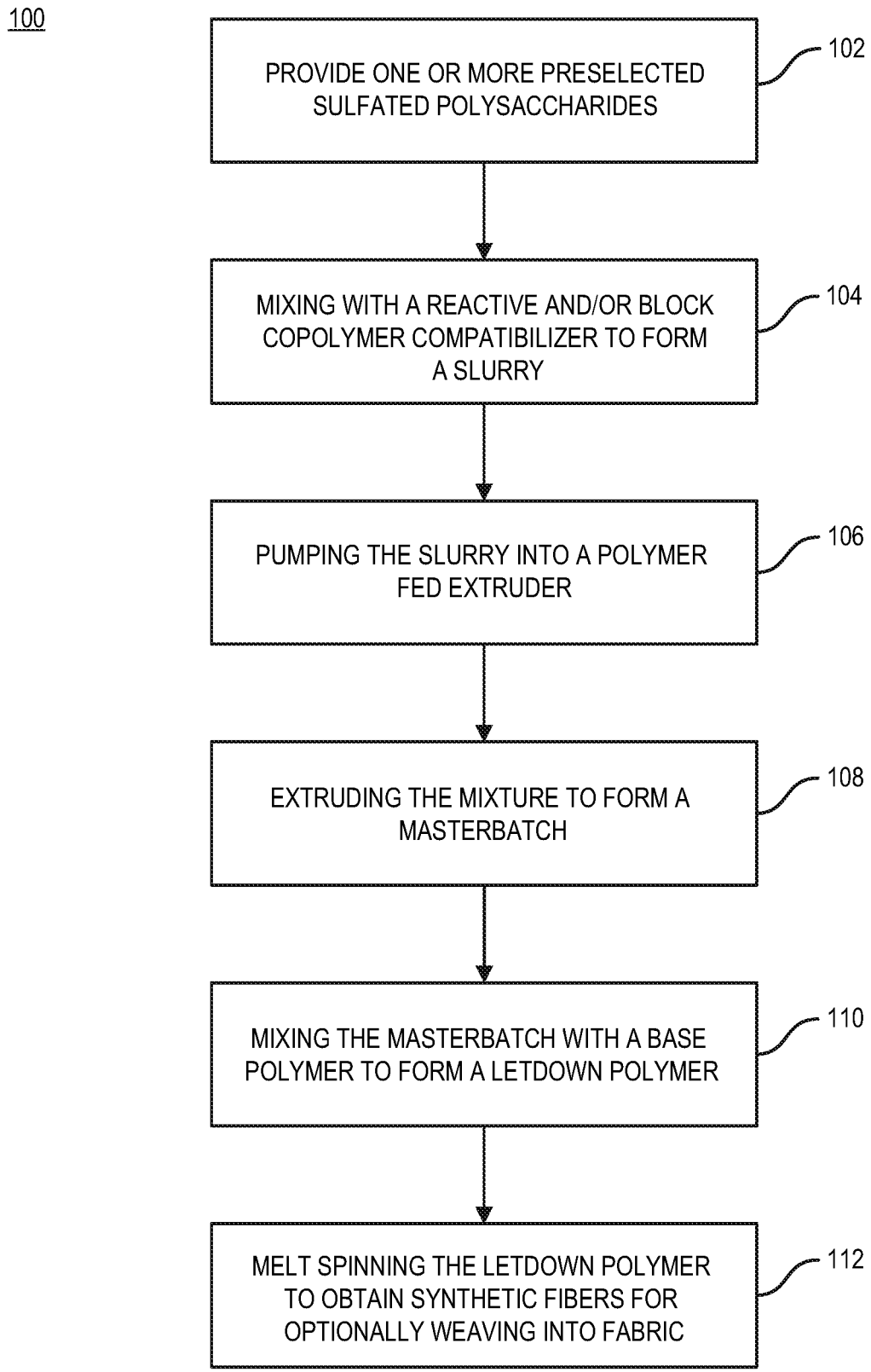
FIG. 1 is a flowchart of a method for manufacturing textiles having desirable antimicrobial and/or antifungal properties.

In one aspect, this document describes an algae-derived flexible or rigid foam. Specifically, foam is a substance that is formed by trapping pockets of gas in a transitionary material such as a liquid in the course of transitioning into a solid. In such instances, the volume of gas within the material may have a smaller to a larger diameter dependent upon the manner in which the foam is produced. These pockets of gas separate various regions of material one from the others. As such, foams may be closed cell foams or open cell, reticulated, foams, based upon how the pockets of air are formed and maintained within the surrounding, substrate material.

For instance, in an open-cell foam, the gas pockets are not completely surrounded by the substrate material, but rather are open and connected with each other. In a closed-cell foam, the gas forms discrete pockets, where each pocket is completely surrounded by the substrate material, e.g., media. Hence, in an open cell foam, a fluid material may flow freely through the substrate, whereas in a closed foam cell it may not, e.g., because the gas pockets are sealed from one another.

Particularly, open and closed cell foams form from dispersed media, where gas bubbles may be produced and trapped in lesser or greater amounts in the media so as to be present in higher or lesser amounts. These gas bubbles may be of uniform or disparate size (polydisperse), and uniformly or randomly dispersed throughout the substrate media, such as where the bubbles are formed through agitation, aeration, and the like. Likewise, the gas bubbles may be of lesser or greater diameter, so as to form very fine thin film foam, such as to form a colloid, or to form large compressible sheets of foam. Accordingly, the size of the bubble plays an important role in the properties of the underlying substrate material, the larger and more random the bubbles, the more cushion like the resultant material will be, whereas the more uniform and smaller the bubbles the more akin to a thin film will be the material.

Specifically, reticulation affects many of the physical properties of a foam. Typically resistance to compression is decreased while tensile properties like elongation and resistance to tearing are increased, when increasing reticulation. For instance, the cell size and cell size distribution of open cell foams are useful parameters that may be modulated based on the determined application to which the foam is to be used. Likewise, the porosity of the underlying substrate may be modulated so as to change the characteristics of the generated foam. Particularly, in various instances, the porosity of the underlying reticulated foam may be more than about 70%, such as more than about 80%, such as more than about 90%, more than about 95%, even more than about 98%. More particularly, the reticulated form of the polyurethane means that the cell membranes have been removed, e.g., electrically or chemically. In certain instances, the reticulation is on the order of about 50 to about 150, such as about 60 to about 140, for instance, about 70 or about 75 to about 120 or about 130, including about 80 to about 100 or about 90 pores/inch of reticulated foam. In this regard, the higher the cell or pore count, the more cosmetically acceptable is the material because the cells are smaller and thus have a more pleasing aesthetic appearance.

Another important characteristic of foams is derived from the thickness of the actual substrate material produced. A further characteristic is determined by the liquid-air interface generated during the formation process. This interface may be effected in various ways, such as by the addition of surfactants or other particles, for example, so as to make them more stable. Particularly, several conditions are produced during the formation of a foamed material. For example, work must be performed within the substrate material so as to add a gas to the media and thereby expand or otherwise increase its surface area. Further, as explained below, surfactants or other surface active particles may be added during this process to modulate, e.g., increase or reduce, the surface tension, and thereby reduce or increase expansion.

Specifically, a foam material may be produced, generally, by dispersing lesser or greater amounts of gas through a liquid media forming the substrate material. However, such dispersion is limited by the buoyancy force causing the bubble to raise through the media, also affected by the radius of the bubbles formed, the density and/or viscosity of the media, e.g., surface tension, and gravity. As such, the quality and characteristics of the resulting foam may be modulated by modulating any one or more of these characteristics. More specifically, as more gas is pushed into the bubble, the buoyancy force grows quicker than the surface tension force, and detachment will occur when the buoyancy force is large enough to overcome the surface tension force. Van der Waals forces between the molecules in the foam will cause the bubbles to be more or less stable, dependent upon their individual radius and overall dispersion uniformity.

Accordingly, as disclosed herein, a foam material may be provided. The foam material may be a liquid media. In other instances, a solid foam material may be provided. The solid foam material may be an open-cell, e.g., reticulated, and/or a closed-cell foam. Open cell or reticulated foam is a very porous, low-density solid foam. As indicated above, open-cell-structured foams contain pores that are connected to each other and form an interconnected network that is relatively soft. Hence, open-cell foams will fill by that whichever they are surrounded. If filled with air, a relatively good insulator material will result, if filled with water, such insulation properties may be reduced. The low density of these foams makes them excellent as thermal insulators and cushioning materials as well as flotation devices, and their lightness and compressibility makes them ideal as packing materials and stuffing. These open-cell materials may be used in a wide range of applications where the high porosity and large surface area are useful. Further, both open and closed cells can be filled with a specialized gas so as to provide improved insulation.

Closed-cell foams, on the other hand, do not have interconnected pores. The closed-cell foams normally have higher compressive strength due to their structures, and are also in general denser than open-cell foams. However, though denser, closed-cell foams require more material, and as a consequence are more expensive to produce. Furthermore, the closed-cell structure foams have higher dimensional stability, low moisture absorption coefficients, and higher strength compared to open-cell-structured foams. Particularly, due to the flexible, closed cell, and cross-linked configuration of closed cell foams, they have a very fine micro-cellular structure, which structure gives the final polyurethane foam product a smooth surface that does not absorb water is ozone resistant and impervious to mildew, mold, rot, and with the addition of the algal supplements disclosed herein are resistant to fungus, bacteria, and viruses. Hence, this closed cell configuration makes these types of foams particularly useful for waterproof materials such as floatation devices, such as life preservers, life jackets, and the like; cushioning, such as for furniture, such as boat cushions; mattings, e.g., exercise mats, including yoga mats; sealants, such as spay or solid sealant units; gaskets; packaging; camping products; toys; and other consumer products.

Open and closed cell foams may be produced out of one or more liquid media that when cooled hardens into a solid substrate. The liquid material forming the solid component of the foam may be an organic polymer, such as polyurethane, which may be used to form a "PU" foam, a ceramic material foam, a metal foam, and/or a an algae-derived flexible or rigid foam. For instance, polyurethanes are linear polymers that have a molecular backbone containing carbamate groups, e.g., —$NHCO_2$. As described herein, these groups, called urethane, may be produced through a chemical reaction between a diisocyanate and a polyol. Such PU foams have many uses such as insulation, in buildings and construction, surface coatings, adhesives, solid plastics, foam cushions, such as for use in furniture, fibers, such as for use in apparel, e.g., athletic apparel and carpets, fire retardant materials, shoe soles and/or inserts thereof.

Generally, polyurethane polymers are macromolecules that are made up of smaller, repeating units known as monomers. These monomers and the resulting macromolecules made up of them may be composed of a primary long-chain backbone molecule with attached side groups, such as where a carbamate group may be associated with the molecular backbone. As explained herein, synthetic polymers, like polyurethane, are produced by reacting monomers in a reaction vessel. Particularly, in order to produce polyurethane, a condensation reaction step may be performed. Specifically, in this type of chemical reaction, the monomers that are present contain reacting end groups. Particularly, a diisocyanate, e.g., OCN—R—NCO, may be reacted with a diol, e.g., HO—R—OH.

Accordingly, the first step of this reaction results in the chemical linking of the two molecules leaving a reactive alcohol (OH) on one side and a reactive isocyanate (NCO) on the other. These groups react further with other monomers to form a larger, longer molecule. This is a rapid process that yields high molecular weight materials. Further, as described herein, these polyurethanes may be generated in such a manner so as to have important commercial uses such as by including particular functional groups, such as including esters, ethers, amides, urea groups, or the like, in the molecule.

More specifically, polyurethanes may be produced by mixing two or more liquid streams. Particularly, a first stream may be provided where the first stream includes a polyol, one or more catalysts, surfactants, blowing agents, and so on. The second stream to be provided may be an isocyanate stream. Together these mixtures of streams form a 'resin' or 'resin blend'. This resin blend may include various additives such as chain extenders, cross linkers, surfactants, blowing agents, pigments, fillers, and/or other agents, such as flame retardants. The resultant polyurethanes can be made in a variety of densities and hardnesses, such as by varying the amounts of polyol, isocyanate, and/or crosslinking and/or additives present in one or more of the streams.

More particularly, a reticulated polyurethane foam may be produced in any suitable manner. For example, a reticulated PU foam may be produced in a multi-step process. Specifically, a two-step procedure may be employed in the production of a PU foam. First, a conventional closed-cell polyurethane foam may be produced, such as by the methods herein described, then the faces (or "windows") of the cells may be removed. More specifically, the primary unit of such foams is a repeating polyhedron that may have eight, nine, ten, eleven, twelve, thirteen, or more faces. However, in a reticulated foam only the edges of the polyhedra remain; the faces are removed.

Hence, in a reticulated foam, up to 80%, such as more than about 90%, more than about 95%, even more than about 98% of the faces may be removed. In certain instances, the basic unit of the polyhedron may be dodecahedron, and in certain instances, the basic unit for these foams, a polyhedron with 13 faces, albeit with the faces removed. For instance, the high surface area and lower mass of the faces of the cells compared with the edges of the cells makes the faces much more susceptible to either combustion and chemical degradation. Thus, the faces of the polyhedron cells may be removed either by filling the closed-cell foam with a combustible gas, e.g., like hydrogen, and igniting it (such as under controlled conditions), or exposing the foam to a basic solution, e.g., a sodium hydroxide solution, which will remove the faces and leave the edges.

Accordingly, as disclosed herein, in certain embodiments, a solid foam material may be provided. For instance, a closed-cell or open-cell foam may be provided, such as where the foaming media may be composed of polyurethane. Particularly, as indicated, such foams can be either "closed-cell", where most of the original bubbles or cells remain intact, or "open-cell", where the bubbles have broken but the edges of the bubbles are stiff enough to retain their shape. Open-cell foams feel soft and allow air to flow through the cells, so they may be used in the production of seat cushions or mattresses, and closed-cell foams may be formulated to produce rigid components that may be used as thermal insulation and/or fire retardants. Microcellular foams may also be produced, which foams may form tough elastomeric materials that may be used in shoe soles and inserts, e.g., insoles.

Specifically, as described herein, polyurethane is a polymer composed of repeating organic units joined by carbamate (urethane) links. More specifically, polyurethane polymers are most commonly formed by reacting a di- or polyisocyanate with a polyol. For example, in various embodiments, a polyurethane may be produced by reacting an isocyanate containing one, two, or more isocyanate groups per molecule, e.g., R—(N=C=O)n, with a polyol containing on average two or more hydroxyl groups per molecule, e.g., R'—(OH)n, such as in the presence of a catalyst or by activation with ultraviolet light. Such as in accordance with the following:

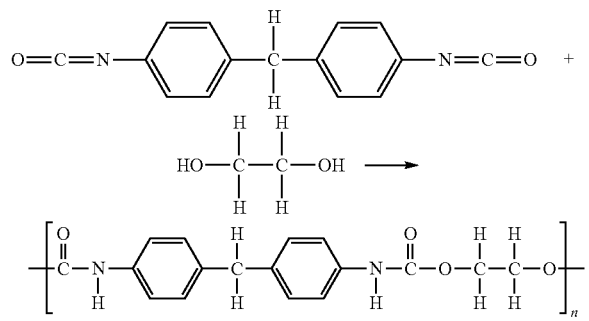

Generally, both isocyanates and polyols may be used to make polyurethanes. Particularly, one of the key reactive materials used to produce polyurethanes are diisocyanates. As explained herein, these compounds are characterized by a —NCO group, which are highly reactive alcohols. Accordingly, particularly useful isocyanates employed in polyurethane production are toluene diisocyanate (TDI) and polymeric isocyanate (PMDI). TDI is produced by chemically adding nitrogen groups on toluene, reacting these with hydrogen to produce a diamine, and separating the undesired isomers. PMDI is derived by a phosgenation reaction of aniline-formaldehyde polyamines. In addition to these isocyanates, higher end materials are also available. These include materials like 1,5-naphthalene diisocyanate and bitolylene diisocyanate. These more expensive materials can provide higher melting, harder segments in polyurethane elastomers.

Further, the other reacting species used to produce polyurethanes may be compounds that contain multiple alcohol groups (OH), called polyols. Materials often used for this purpose are polyether polyols, which are polymers formed from cyclic ethers. They are typically produced through an alkylene oxide polymerization process. They are high molecular weight polymers that have a wide range of viscosity. Various polyether polyols that may be used include polyethylene glycol, polypropylene glycol, and polytetramethylene glycol. These materials are generally utilized when the desired polyurethane is going to be used to make flexible foams or thermoset elastomers. Likewise, polyester polyols may also be used as a reacting species in the production of polyurethanes. They can be obtained as a byproduct of terephthalic acid production. They are typically based on saturated aromatic carboxylic acids and diols. As described herein, branched polyester polyols may be used for polyurethane foams and coatings.

Additionally, some polyurethane materials can be vulnerable to damage from heat, light, environmental and/or atmospheric contaminants, and chlorine. In other instances, anti-fungal, anti-microbial, anti-viral and/or other useful characteristics may be added to the reaction mixture, e.g., via the algae extracts disclosed herein, so as to give the underlying polyurethane material useful characteristics. For this reason, additives and/or stabilizers may be added to protect and/or modify the polymer. For instance, one type of stabilizer that protects against light degradation is a UV screener called hydroxybenzotriazole. To protect against oxidation reactions, antioxidants may be used. Various antioxidants are available such as monomeric and polymeric hindered phenols. Compounds that inhibit discoloration caused by atmospheric pollutants may also be added. These are typically materials with tertiary amine functionality that can interact with the oxides of nitrogen in air pollution. For certain applications, antimildew, anti-fungal, anti-microbial, and/or anti-viral additives are added to the polyurethane product. Specifically, for these purposes, algae derived compounds, such as fucoidian and/or sulfated polysaccharides, as herein explained, may be added so as to impart antimildew, antimicrobial, antifungal, and/or anti-viral properties to the polyurethane, as well as to the products made therefrom. In certain embodiments, fire-retardancy may be added or otherwise enhanced, such as by the addition of such fucoidian and/or sulfated polysaccharides disclosed herein.

More specifically, with respect to production of polyurethanes, in certain embodiments, both the isocyanates and polyol precursors used to make the polyurethanes contain, on average, two or more functional groups per molecule. Isocyanates generally may be highly reactive materials, and hence are useful in making the polymers of the disclosure. Particularly, the aromatic isocyanates, diphenylmethane diisocyanate (MDI) or toluene diisocyanate (TDI) are more reactive than aliphatic isocyanates, such as hexamethylene diisocyanate (HDI) or isophorone diisocyanate (IPDI). In particular, isocyanates are useful because they may be difunctional thereby having about two isocyanate groups per molecule. In various instances, a mixture of molecules with two, three, and four or more isocyanate groups may be employed as a reactant, such as a polymeric diphenylmethane diisocyanate.

However, in various instances, a non-isocyanate based polyurethane may be produced. In particular instances, such reactants may be a reaction polymer, which may include epoxies, unsaturated polyesters, and phenolics. Specifically, in certain embodiments, isocyanates may be used to make polyurethane, such as where the cyanates may have two or more isocyanate groups on each molecule. Useful isocyanates that may be used may be one or more of aromatic diisocyantes, toluene diisocyanate (TDI), and/or methylene diphenyl diisocyanate, MDI. For instance, both TDI and MDI may be employed, especially since these isocyanates are generally less expensive and more reactive than other isocyanates.

For example, in particular instances, e.g., for industrial grade uses, TDI and MDI isocyanates for use in accordance with the disclosed methods may include mixtures of isomers, and may include polymeric materials. Such TDI and MDI isocyanates may be employed and used to make flexible foams, e.g., for example slabstock foam such as for mattresses, and/or molded foams such as for car seats, rigid foam, e.g., for insulating foam such as in refrigerators, and various elastomers such as shoe soles and insoles, and the like.

Further, as indicated above, these and other isocyanates may be modified such as by partially reacting them with polyols or introducing some other materials to reduce volatility (and hence toxicity) of the isocyanates, decrease their freezing points to make handling easier, or to improve the properties of the final polymers, such as for use in various foams. Likewise, aliphatic and/or cycloaliphatic isocyanates may be used, e.g., in lesser quantities, in coatings and other applications where color and transparency are important since polyurethanes made with aromatic isocyanates tend to darken on exposure to light. Hence, useful aliphatic and cycloaliphatic isocyanates for use in these methods may include one or more 1,6-hexamethylene diisocyanate (HDI), 1-isocyanato-3-isocyanatomethyl-3,5,5-trimethyl-cyclohexane (isophorone diisocyanate, IPDI), and 4,4'-diisocyanato dicyclohexylmethane, (H12MDI or hydrogenated MDI).

With respect to polyols, the polyol may be a polyether polyol such as may be made by co-polymerizing ethylene oxide and propylene oxide with a suitable polyol precursor. The polyols used to make polyurethanes may be, but need not be, mixtures of similar molecules with different molecular weights, and mixtures of molecules that contain different numbers of hydroxyl groups. It is to be noted that the length of the polyol backbone chain predominately contributes to the functionality of the final polymer. For example, if the production of a rigid polyurethane is desired, the polyol used to make the rigid polyurethane may be a polyol having a molecular weight in the hundreds, while if a more flexible polyurethane is desired, the polyol used to make the flexible polyurethane may have a molecular weight from the thousands, such as up to tens of thousands, or more.

Accordingly, the properties of a polyurethane may be influenced by various different mechanisms, such as by the type of isocyanates and/or polyols used to make it. Additionally, other types of functional groups may be employed to modulate the properties of the underlying PU. For instance, a long, flexible polyol segment may be incorporated into the polyurethane so as to give a soft, elastic polymer, whereas high amounts of crosslinking may be generated so as to give tough or rigid polymers. Likewise, long chains and low crosslinking results in a polymer that is stretchable, e.g., very stretchy; and short chains with a greater amount of crosslinks produce a hard polymer. Further, long chains and intermediate crosslinking may be used to produce a polymer, such as that is useful for making foam.

Hence, various crosslinking configurations may be used to affect the functionality of the underlying polyurethanes. The choices available for the isocyanates and polyols, in addition to other additives and processing conditions allow polyurethanes to have the very wide range of other properties. Specifically, a crosslinking configuration may produce a polymer having a three-dimensional network, and a high molecular weight, thereby modulating the polyurethane.

Further still, polyols can be polyether polyols, which are made by the reaction of epoxides with an active hydrogen containing compounds. Or the polyol may be a polyester polyol such as made by the polycondensation of multifunctional carboxylic acids and polyhydroxyl compounds. Polyols can be further classified according to their end use. Higher molecular weight polyols, e.g., molecular weights from about 1,000 to about 2,000 up to about 10,000 or about 15,000, including about 7,000 or about 8,000 may be used to make more flexible polyurethanes, while lower molecular weight polyols may be used to make more rigid products. Additionally, polyols for more flexible applications may use low functionality initiators such as dipropylene glycol, glycerine, or a sorbitol/water solution, whereas polyols for rigid applications may use high functionality initiators such as sucrose, sorbitol, toluenediamine, and Mannich bases.

Particularly, propylene oxide and/or ethylene oxide may be added to the initiators until the desired molecular weight is achieved. The order of addition and the amounts of each oxide may be configured so as to affect a wide range of polyol properties, such as compatibility, water-solubility, and reactivity so as to produce a polyurethane having the desired characteristics. For instance, polyols made with only propylene oxide are terminated with secondary hydroxyl groups, and because of which may be less reactive than polyols capped with ethylene oxide, which contain primary hydroxyl groups. Graft polyols, on the other hand, may contain finely dispersed styrene-acrylonitrile, acrylonitrile, or polyurea (PHD) polymer solids chemically grafted to a high molecular weight polyether backbone. Such graft polyols may be used to increase the load-bearing properties of low-density high-resiliency (HR) foam, as well as to add toughness to microcellular foams and cast elastomers. Initiators such as ethylenediamine and triethanolamine may be used to make low molecular weight rigid foam polyols that have built-in catalytic activity, e.g., due to the presence of nitrogen atoms in the backbone. A special class of polyether polyols, poly(tetramethylene ether) glycols, which are made by polymerizing tetrahydrofuran, may be used in high performance coating, wetting, and/or elastomer applications.

Additionally, conventional polyester polyols may be manufactured by the direct polyesterification of high-purity diacids and glycols, such as adipic acid and 1,4-butanediol. However, such polyester polyols are usually more expensive and more viscous than polyether polyols, but they make polyurethanes with better solvent, abrasion, and cut resistance. Other polyester polyols that may be used are based on reclaimed raw materials. For example, such polyester polyols may be manufactured by transesterification (glycolysis) of recycled poly(ethyleneterephthalate) (PET) or dimethylterephthalate (DMT) distillation bottoms, such as with glycols, e.g., diethylene glycol. These low molecular weight, aromatic polyester polyols may be used in rigid foam, and bring low cost and excellent flammability characteristics to polyisocyanurate (PIR) boardstock and polyurethane spray foam insulation.

Specialty polyols include polycarbonate polyols, polycaprolactone polyols, polybutadiene polyols, and polysulfide polyols. These materials may be used in elastomer, sealant, and adhesive applications that require superior weatherability, and resistance to chemical and environmental attack. Natural oil polyols derived from castor oil and other vegetable oils may also be used to make elastomers, rigid or flexible bunstock, and flexible molded foam. Co-polymerizing chlorotrifluoroethylene or tetrafluoroethylene with vinyl ethers containing hydroxyalkyl vinyl ether produces fluorinated (FEVE) polyols. Two-component fluorinated polyurethanes prepared by reacting FEVE fluorinated polyols with polyisocyanate may be used to make paints and/or other coatings.

Since fluorinated polyurethanes contain a high percentage of fluorine-carbon bonds, which are the strongest bonds among all chemical bonds, fluorinated polyurethanes along with the algae extracts set forth herein exhibit resistance to UV light, acids, alkali, salts, chemicals, solvents, weathering, corrosion, mildew, fungi, and microbial as well as viral attack. These and other polyurethanes may be used for high performance coatings and paints. Further, phosphorus-containing polyols that become chemically bonded to the resultant polyurethane matrix along with fucoidian, and/or a sulfated polysaccharide, or derivatives thereof, may be used as a flame retardant. Such a covalent linkage as this prevents migration and leaching of the organophosphorus compound. Even polyols prepared from renewable sources like vegetable oils, derivatives of vegetable oil, sorbitol, cellulose, etc. may also be used for preparing polyurethane coatings.

Additionally, as indicated, various resin blends may include additives such as chain extenders, cross linkers, and surfactants, e.g., which may be used to produce flame retardants, and/or blowing agents. For instance, during the expansion, e.g., foaming process, blowing agents may be added to the mixture when the material to be foamed is in a liquid stage. Such blowing agents can be added either by a physical process, such as by physically blowing a gas, e.g., air or $CO_2$ into the plastic, or via a chemical process, such as during a chemical reaction that creates gas, e.g., $CO_2$, in the foam. Various pigments, thickeners, and/or fillers may also be included. In a manner such as these, polyurethane can be made in a variety of densities and hardnesses by varying the isocyanate, polyol, and/or other additives and agents.

Accordingly, as indicated, making a foam requires the formation of a gas at the same time as the urethane polymerization, e.g., gelation, is occurring. The gas can be any suitable gas, e.g., carbon dioxide, which may be generated by reacting isocyanate with water, added separately as a gas during the reaction process, or it may be produced by boiling volatile liquids. In the latter case, the heat generated by the polymerization may cause the liquids to vaporize, such liquids as HFC-245fa (1,1,1,3,3-pentafluoropropane) and HFC-134a (1,1,1,2-tetrafluoroethane), and hydrocarbons such as n-pentane. The balance between gelation and blowing is sensitive to operating parameters including the concentrations of water and catalyst, which may be modified as desired to change the resulting characteristics of the polyurethane.

The reaction to generate carbon dioxide involves water reacting with an isocyanate first forming an unstable carbamic acid, which then decomposes into carbon dioxide and an amine. The amine reacts with more isocyanate to give a substituted urea. Water has a very low molecular weight, so even though the weight percent of water may be small, the molar proportion of water may be high and considerable amounts of urea produced. The urea is not very soluble in the reaction mixture and tends to form separate "hard segment" phases consisting mostly of polyurea. The concentration and organization of these polyurea phases can have a significant impact on the properties of the polyurethane foam. One or more catalyst or other cross-linkers or elongaters may be included to facilitate the reaction process and produce the desired polyurethane, such as a polyurethane foam.

Specifically, polyurethane catalysts, such as those set forth above, can be classified into two broad categories, basic and acidic amine. Tertiary amine catalysts function by enhancing the nucleophilicity of the diol component. Alkyl tin carboxylates, oxides and mercaptides oxides function as mild Lewis acids in accelerating the formation of polyurethane. As bases, traditional amine catalysts include [triethylenediamine]] (TEDA, 1,4-diazabicyclo[2.2.2]octane or DABCO), dimethylcyclohexylamine (DMCHA), and dimethylethanolamine (DMEA). A typical Lewis acidic catalyst is dibutyltin dilaurate. The process is highly sensitive to the nature of the catalyst and is also known to be autocatalytic.

Factors affecting catalyst selection include balancing three reactions: urethane (polyol+isocyanate, or gel) formation, the urea (water+isocyanate, or "blow") formation, or the isocyanate trimerization reaction (e.g., using potassium acetate, to form isocyanurate rings). A variety of specialized catalysts have been developed. High-density microcellular foams can be formed without the addition of blowing agents by mechanically frothing or nucleating the polyol component prior to use.

Likewise, as indicated, surfactants may be used to modify the characteristics of both foam and non-foam polyurethane polymers. They take the form of polydimethylsiloxane-polyoxyalkylene block copolymers, silicone oils, nonylphenol ethoxylates, and other organic compounds. In polyurethane foams, such surfactants may be used to emulsify the liquid components, regulate cell size, and stabilize the cell structure, e.g., to prevent collapse, surface defects, and sub-surface voids. Specifically, rigid foam surfactants may be used so as to produce very fine cells and a very high closed cell content. Whereas, flexible foam surfactants may be used to stabilize the reaction mass while at the same time maximizing open cell content, e.g., to prevent the foam from shrinking. An even more rigid foam can be made by use with specialty trimerization and other catalysts that create cyclic structures within the foam matrix, giving a harder, more thermally stable structure, designated as polyisocyanurate foams. Such properties may be useful in the production of rigid foam products such as used in the construction. Careful control of viscoelastic properties—by modifying the catalysts and polyols used—can lead to memory foam, which is much softer at skin temperature than at room temperature.

Further, reticulated ceramic foams may be made by coating a reticulated polyurethane foam with an aqueous suspension of a ceramic powder then heating the material to first evaporate the water then fuse the ceramic particles and finally to burn off the organic polymer. Additionally, a reticulated metal foam can also be made using polyurethane foam as a template similar to its use in ceramic foams. Metals can be vapor deposited onto the polyurethane foam and then the organic polymer burned off. Further still, in various instances, the foam material may be a liquid media. Furthermore, as herein described an algae or algae extract may be employed so as to further modulate the properties of the resultant foam substrates and the products made from them.

Accordingly, polyurethanes can be produced in four different forms including elastomers, coatings, flexible foams, and cross-linked foams. Elastomers are materials that can be stretched but will eventually return to their original shape. They are useful in applications that require strength, flexibility, abrasion resistance, and shock absorbing qualities. Thermoplastic polyurethane elastomers can be molded and shaped into different parts. This makes them useful as base materials for automobile parts, furniture cushions or other bulking materials, ski boots, roller skate wheels, cable jackets, and other mechanical goods. When these elastomers are spun into fibers they produce a flexible material called spandex and/or fibers that can be used for making carpets. Spandex is used to make sock tops, bras, support hose, swimsuits, workout shirts, shorts, and other athletic apparel. Polyurethane coatings show a resistance to solvent degradation and have good impact resistance. These coatings can be used on surfaces that require abrasion resistance, flexibility, fast curing, adhesion, and chemical resistance. Water based polyurethane coatings for making paints, including water-resistant paints.

Flexible foams are the largest market for polyurethanes. These materials have high impact strength and are used for making most furniture cushioning and other cushioning elements and components, such as for the soles and insoles for shoes. They also provide the material for mattresses and seat cushions, such as in higher priced furniture. Semiflexible polyurethane foams, on the other hand, as herein described, may be used to make car dashboard, door liners, speaker components, and the like. Other uses include carpet underlay, packaging, sponges, squeegees, and interior padding. Rigid, or cross-linked, polyurethane foams of the disclosure, may be used to produce insulation in the form of boards or laminate, which laminates may be used extensively in the commercial roofing industry. Buildings are often sprayed with a polyurethane foam.

Accordingly, while polyurethane polymers, as herein disclosed, are used for a vast array of applications, their production method can be broken down into three distinct phases. First, the bulk polymer product is made. Next, the polymer is exposed to various processing steps. Finally, the polymer is transformed into its final product, e.g., thermo resistant clothing, anti-microbial carpets, yoga mats, shoe insoles, and the like. Consequently, at the start of polyurethane foam production, the reacting raw materials, as described above, may be injected as liquids in large, e.g., stainless steel, tanks. Typically, these tanks are equipped with agitators to keep the materials fluid motion. A metering device may be attached to the tanks so that the appropriate amount of reactive material can be pumped in and/or out. For instance, a typical ratio of polyol to isocyanate may be about 1:4, 1:3, 1:2, 3:1, 4:1, and the like. Since the ratio of the component materials produces polymers with varying characteristics, it may be strictly controlled. Secondly, the reacting materials may be passed through a heat exchanger as they are pumped into pipes. The exchanger adjusts the temperature to the reactive level. Inside the pipes, the polymerization reaction occurs. By the time the polymerizing liquid gets to the end of the pipe, the polyurethane is already formed. On one end of the pipe is a dispensing head for the polymer. Further, the dispensing head may be hooked up to a processing line.

Next, for the production of flexible, semi-rigid, or rigid polyurethane foam, a mold or other substrate, e.g., a roll of baking paper, may be placed or spooled, or otherwise positioned at the start of the processing line. The mold or substrate may be moved along a conveyor and brought under the dispensing head. As the substrate passes under the dispensing head, the liquid polyurethane is blown onto it. Further, as the polymer is dispensed, it may be mixed with a gas, e.g., carbon dioxide, thereby causing the mixture to expand. It continues to rise as it moves along the conveyor. At this point, the sheet of polyurethane is termed as a bun because it "rises" like dough.

After the expansion reaction begins, a second top layer of a substrate, e.g., paper, is positioned or rolled on to the conveyor. Additionally, side-bounding members, e.g., papers, may also be placed into the process. Each layer of the substrate contains the polyurethane foam giving it the desired shape. The foam, e.g., a rigid foam, may then be passed through a series of panels that are configured so as to control the width and height of the foam bun. Further, as they travel through this section of the production line, they are typically dried. At the end of the production line, the foam bun may be cut with an automatic cutter, e.g., saw or laser, to the desired shape and form. The foam bun is then conveyored to the final processing steps that may include packaging, stacking, and/or shipping.

Additionally, in other instances, a flexible ethylene vinyl acetate (EVA) foam, or the like, may be produced, formed, and constructed into a final product. For instance, EVA is a closed-cell foam composed of an elastomeric polymer that may be used to produce materials that are similar to rubber or otherwise "rubber-like" in softness and/or flexibility. Particularly, EVA foam has a high level of chemical cross-linking that may result in a semi-flexible or semi-rigid product with a fine uniform cell structure. With respect to EVA production, EVA is derived from poly(ethylene-vinyl acetate) (PEVA). Specifically, ethylene-vinyl acetate foam is made from blending copolymers of ethylene ($C_2H_4$) and vinyl acetate ($CH_3CO_2CHCH_2$). It is produced under pressure by the copolymerization of ethylene and vinyl, e.g., vinyl acetate, using free radical catalysts. The weight percent vinyl acetate usually varies from about 5% or about 10% to about 30% or about 40% or about 50%, such as from about 15% to about 25%, including about 20% by weight, with the remainder of the polymer being ethylene. Hence, there are several different types of EVA, such as where the vinyl acetate amount ranges from between about 5% or less to about 50% or more.

Depending on the mixture and the way of manufacturing, EVA can be made into a number of shapes and molds. Foam injection molding may be employed to produce EVA containing products. For instance, similar to the methods described above with respect to the production of polyurethane foams, EVA foams may be produced in a manner so s to form buns by foam injection where the hot, liquid foam mixture of ethylene, vinyl and acetate is sprayed on to a substrate and/or into a mold. It is allowed to cool to give the foam time to expand, and then the mold is popped open. Once the mold is popped open, the new piece of EVA material is made, and simply needs to cool off. In various instances, depending on the application, EVA foam may have a density that ranges from about 1 or 5 or 10 to 30 to about 100 or 200 or 300 to about 400 kg/m3 or more. The maximum length, width and thickness of the PU or EVA buns vary depending upon the foam's density.

EVA has good clarity and gloss, low-temperature toughness, stress-crack resistance, hot-melt adhesive waterproof properties, and resistance to UV radiation. Because of its softness and flexibility, EVA is competitive with rubber and vinyl products in many applications. For example, EVA foam may be used to produce non-toxic and anti-flammable foam materials such as mats, e.g., yoga mats, soles for shoes, cushions and linings, as well as to form EVA foam sheets. Particularly, with respect to shoe components, both polyurethane and EVA foam may be used to produce soles, midsoles, and/or the insoles of shoes, so as to create the cushioning and/or supporting aspect of the shoe. However, EVA may be softer and more resilient than Polyethylene, and may have greater recovery characteristics after compression. Nevertheless, PU is typically denser and heavier than EVA, and thus may have better durability.

More particularly, running shoe midsoles and insoles are generally made of foam and/or plastic polymers (large molecule consisting of organized and repeated subunits) that are constructed and/or otherwise designed to absorb impact and to protect the foot during walking and/or running. PU and EVA foam soles and midsoles accomplish this task by compressing on impact, followed by expanding back to their original shape after impact so as to be able to compress again for the next foot strike. A blend of PU/EVA midsoles and/or soles may also be employed, such as where the PU is employed as a hard posting system found in motion-control category shoes, and the EVA makes up the remainder of the midsole unit. In certain instances, the PU to be employed may be a TPU, which is used to make a foam (eTPU), which may then be used to produce the midsole. The thermoplastic properties of this eTPU material are produced from tiny bead precursors that may be molded with heat and pressure to make the desired midsole geometry.

Additionally, as set forth above, in various instances, antimildew, anti-fungal, anti-microbial, and/or anti-viral additives are added to the EVA product. Specifically, for these purposes, algae derived compounds, such as fucoidian and/or sulfated polysaccharides, as herein explained, may be added so as to impart antimildew, antimicrobial, antifungal, and/or anti-viral properties to the EVA, as well as to the products made therefrom. In certain embodiments, fire-retardancy may be added or otherwise enhanced, such as by the addition of such fucoidian and/or sulfated polysaccharides disclosed herein. Accordingly, in various implementations, an algae-derived flexible foam can be made to have identical properties and characteristics of polyurethane (PU) and/or ethylene vinyl acetate (EVA) foam or the like, and yet contain antimicrobial substances antimildew, antimicrobial, antifungal, and/or anti-viral properties.

Specifically, algae are plantlike protists, which may be eukaryotic, unicellular or multicellular organisms. Like plants, algae have chloroplasts, and their cells are strengthened by a cell wall. The term algae refers to aquatic organisms that carry on photosynthesis, and are typically part of a fresh water system's phytoplankton. Algae may be classified by pigmentation, such as green Chlorophyta, brown Phaeaphyta, golden brown Chrysphyta, and red Rhodophyta for example.

Although all algae share various typical physical traits, so as to appear to be related, in many instances various members of the group commonly referred to as algae are in fact unrelated and/or are derived from multiple ancestral sources. In particular, algae may be unicellular or multicellular, but in most instances are aquatic. Algae derive their energy from photo or chemo-synthesis and tend to be self-nourishing organisms that are capable of producing complex compounds such as carbohydrates, fats, and proteins, such as from simple substances present in their local environments.

Particularly, multicellular forms of algae include kelps, such as giant kelp, and brown alga. For instance, brown algae are a large group of multicellular, marine organisms that are typically referred to as seaweeds. Seaweeds are plantlike organisms that typically live attached to the surfaces of rocks or other hard substrata along coastal areas. More particularly, seaweed includes red, brown, and green algae, as described above. However, even though these marine based organisms bare the common name of seaweed they are not derived from a common ancestor, and thus, do not share a common heritage.

Nevertheless, the various members of seaweed do tend to share several phenotypical traits or structures. For example, they typically have a main body or thallus that forms a stem-like structure called a stipe. They also include a plurality of blade structures that are somewhat flattened, leaf-like elements. It is on the basis of the color of the thallus by which seaweeds are distinguished as brown, red, and green algae. Brown and red algae are commonly found in saltwater environments, while green algae are typically found in freshwater. The predominance of the brown color in brown algae is derived from a xanthophyll pigment, e.g., fucoxanthin, and beta-carotene.

These algae generally produce complex polysaccharides, sugars, and alcohols. Examples of brown algae are *Ascophyllum, Fucus, Laminaria, Macrocystis, Saccharina*, and *Undaria*. Specific examples include kelp, limu, *laminaria*, vesiculosus, and wakame. Brown Algae may further be catalogued as brown seaweed, and may include such diverse members as mozuku, kombu, bladderwrack, and hijiki. Fucus vesiculosus, for instance, is a brown seaweed that is composed of a simple chemical composition of fucose and sulfate, but may also include other simple sugars such as mannose, galactose, glucose, xylose, and the like, as well as uronic acids and proteins. Other specific brown seaweeds include *Chorda filum, Ecklonia kurome, F. evanescens, F. distichus, F. serratus, F. vesiculosus*, and *Macrocytis pyrifera*.

The predominance of the red color in red algae is derived from a phycoerthrin and phycocyanin pigments, as well as beta-carotene, and other xanthophils. These algae generally produce cellulose, long-chained polysaccharide, agars, and carrageenans. Examples of red algae are Rhodophyta, *Kappaphycus, Betaphycus*, Corallinaceae, Gigartinaceae, *Gracilaria, Gelidium*, and *Pterocladia*. The predominance of the green color in green algae is derived from chlorophyll a and b pigments, as well as beta-carotene and other xanthophils These algae generally produce fats and oils. Examples of green algae are Bryopsidophytes, *Caulerpa*, Charophytes, Chlorophytes, e.g., *Chlorella, Dunaliella*, Dasycladophytes, Desmids, Siphoncladophytes, *Spirogyra*, Trebouxiophytes, and Ulvophyceae.

The blade further includes a plurality of air bladders, which function to assist in allowing the seaweed to float. A stipe, or stem-like structure may also be present, and typically the air balder is present between the blade and the stipe. Together the blade and stipe form a fond. In aquatic environments, a holdfast, e.g., a basal structure, may be present, so as to provide attachment to local surfaces, e.g., to prevent the seaweed from being washed out to sea. The holdfast will typically include fingerlike extensions so as to better anchor the seaweed to various rocks and surfaces within the aquatic environment.

Today, seaweeds themselves are used in many products, including those that serve as fodder, fertilizers, and food, and dependent on its mode of manufacture may be used as alternative fuel sources and/or biochemicals. Particularly, seaweeds typically grow in seawater (or freshwater, e.g., for green algae), such as by deriving energy from the sun and absorption of carbon dioxide, and may then be processed to give off oxygen, be subjected to nutrient scrubbing, such as to give off a useful effluent. Such algae as herein described may be subjected to extraction processes, such as for the production of various biochemicals; fermentation, such as for use in the production of alcohols and methane gas; and/or pyrolysis, such as for the production of fuels, such as gas.

More particularly, various of these algae, or component parts thereof may be used as human foods, or food products, such as agars, carrageenans, alginates, gums, and the like, as well as in foam containing products, such as cushions, mats, soles, midsoles, and insoles, and the like. For instance, the main components of various algae include water, carbohydrates, such as fucose, proteins, and fats, also sulfates, ash, alginic acid, xylans, laminaran, mannitol, Fucoidan, floriside, tannins, sodium, magnesium, iodine, and other components. For example, see Table I.

TABLE I

| Brown seaweed | Chemical composition |
| --- | --- |
| Adenocytis utricularis | fucose, galactose, mannose, sulfate |
| Ascophyllum nodosum | fucose, xylose, GlcA, sulfate |
| Bifurcaria bifurcate | fucose, xylose, GlcA, sulfate |
| Dictyota menstruali | fucose/xylose/uronic acid/galactose/sulfate |
| Ecklonia kurome | fucose, galactose, mannose, xylose, GlcA, sulfate |
| F. distichus | fucose/sulfate/acetate |
| F. evanescens | fucose/sulfate/acetate |
| F. serratus | fucose/sulfate/acetate |
| F. vesiculosus | fucose, sulfate |
| Himanthalia lorea | fucose, xylose, GlcA, sulfate |
| Hizikia fusiforme | fucose, galactose, mannose, xylose, GlcA, sulfate |
| Laminaria angustata | fucose/galactose/sulfate |
| Lessonia vadosa | fucose, sulfate |
| Macrocytis pyrifera | fucose/galactose/sulfate |
| Padina pavonia | fucose, xylose, mannose, glucose, galactose, sulfate |
| Pelvetia wrightii | fucose/galactose/sulfate |
| Sargassum stenophyllum | fucose, galactose, mannose, GlcA, glucose, xylose, sulfate |
| Spatoglossum schroederi | fucose/xylose/galactose/sulfate |
| Undaria pinnatifida | fucose/galactose/sulfate |

Hence, as can be seen with respect to Table I, fucose is a component constituent of many forms of brown seaweed. Specifically, there are at least two distinct forms of fucoidan: F-fucoidan and U-fucoidan. F-fucoidan is basically composed of sulfated esters of fucose (e.g., about >95%), and U-fucoidan is about 20% glucuronic acid. These different forms are important when configuring brown algae and/or its constituents for industrial and/or commercial use. In particular instances, brown algae and its components, e.g., fucoidan, may include various sulfanates, such as sulfated polysaccharides, sulfated galactofucants, sulfated galactans, and the like.

Accordingly, any of various species of red algae, brown algae, and brown seaweed (marine macroalgae or microalgae) are known to contain high levels of sulfate, such as sulfated polysaccharides, which sulfates have been determined by the inventor hereof to have antimicrobial properties, and can be used in various implementations of the subject matter described herein. An example of a beneficial algal-derived sulfated polysaccharides for use in some implementations is dried fucoidan powder. Fucoidan designates a group of certain fucose-containing sulfated polysaccharides (FCSPs) and is not found in terrestrial plants. It has a backbone built of (1→3)-linked α-l-fucopyranosyl or of alternating (1→3)- and (1→4)-linked α-l-fucopyranosyl residues, but also include sulfated galactofucans with backbones built of (1→6)-β-d-galacto- and/or (1→2)-β-d-mannopyranosyl units with fucose or fucooligosaccharide branching, and/or glucuronic acid, xylose or glucose substitutions.

There are at least two distinct forms of fucoidan: F-fucoidan, which is >95% composed of sulfated esters of fucose, and U-fucoidan, which is approximately 20% glucuronic acid. Fucoidan largely contains sulphated L-fucose residues. Hence, fucose is the primary sugar found in fucoidan. Sulphate groups also represent a large component of fucoidan and the biological activities of fucoidan are strongly related to sulphate. Besides fucose and sulphate, other monosaccharides (glucose, mannose, galactose, xylose, etc), uronic acids, and even protein are present in detectable amounts, though the total composition will vary between species, extraction methods, and environmental conditions.

For instance, Fucoidan derived from brown algae may typically be composed of about 44.1% fucose, 26.3% sulfate and 31.1% ash and/or may contain acetate and other constituents. It is to be noted that the structures and chemical constituents of various fucoidans from different brown algae vary from species to species. Specifically, as indicated Fucoidan is a fucose-containing sulfated polysaccharides that has a backbone of linked fucopyranosyl residues and may include an additional backbone of sulfated galactofucans and mannopyranosyl. The difference in backbone structures of various fucoidans reflects the fundamental difference in fucoidans biosynthesis within the various organisms form which they are produced. Particularly, fucose is a hexose deoxy sugar having a chemical formula of C6H12O5. It includes the following chemical structure:

Fucose is the fundamental sub-unit of the fucoidan polysaccharide. It is to be noted that fucose includes an L-configuration that lacks a hydroxyl group on the carbon at the 6-position (C-6), making it a deoxy sugar. Accordingly, Fucoidan is a polysaccharide that includes a substantial percentage of L-fucose and sulfate ester groups. For instance, ordered fucoidans may contain a linear backbone built up of (1→3)-α-L-Fuc or alternating (1→3)-α-L-Fuc and (1→4)-α-L-Fuc, (1→2)-α-L-Fuc sometimes being present in the backbone branching. Sulfate groups often occupy the C-2 or/and C-3, C-4 of fucose. For fucoidans containing uronic acid (UA) and hexose, the structural core may be built of alternating UA-hexose. This structure is very stable because of this and other sugars present in the branching off at the core backbone.

Hence, fucoidan may also include fucose and/or fucooligosaccharide branching, and may include glucuronic acid, xylose, and various glucose substitutions. Specifically, the core region of Fucoidan is primarily a polymer of α-(1→3) linked fucose with sulfate groups substituted at the C-4 position on some of the fucose residues; fucose may also be attached to this polymer to form branched points, e.g., one for every 2-3 fucose residues within the chain. More specifically, some types of Fucoidan may be composed of a linear backbone of alternating 3- and 4-linked α-L-fucopyranose 2-sulfate residues: →3)-α-L-Fucp(2SO3-)-(1→4)-α-L-Fucp(2SO3-)-(1→, with additional sulfates occupying position 4 in a part of 3-linked fucose residues, whereas a part of the remaining hydroxyl groups may randomly be acetylated.

Other types of Fucoidan may be built up of disaccharide repeating units: →3)-α-L-Fucp-(2,4-di-SO3-)-(1→4)-α-L-Fucp-(2SO3-)-(1→, such as where the regular structure may be only slightly masked by random acetylation and under-sulfation of several disaccharide repeating units. In other instances, fucoidan may have a branched structure, such as where its backbone is →3)-α-L-Fucp-(1→4)-α-L-Fucp-(1→, about half of the 3-linked residues may be substituted at C-4 by α-L-Fucp-(1→4)-α-L-Fucp-(1→3)-α-L-Fucp-(1→trifucoside units. Sulfate groups may also occupy mainly C-2 and sometimes C-4, although 3,4-diglycosylated and some terminal fucose residues may be nonsulfated. Acetate groups may occupy C-4 of 3-linked Fuc and C-3 of 4-linked Fuc, such as in a ratio of about 7:3. Fucoidan may also contain small amounts of xylose and galactose. In further instances, sulfated fucan may have a backbone of (1→4)- and (1→3)-linked-α-L-fucopyranosyl residues that are substituted at C-2 and C-3, and fucosyl residues may be sulfated at C-2 and/or C-4. Additionally, Fucoidan may be composed of one or more well-formed polycrystalline ultra-structures that include sulfated fucan. Such particles may further be constituted by sulfated fucan molecules that are composed partially of a lectin specific for α-L-fucosyl residues.

Hence, as can be seen, the chemical compositions and structures of fucoidans from brown algae are very complex and their structures vary from species to species. Its bioactive properties vary depending on the source from which it is derived, its compositional and structural traits, and its purity. For instance, in various instances, the position of the sulfate groups may be important to various biological activities of fucoidan containing sulfated polysaccharides. For example, most sulfate groups in fucoidan are in axial positions, while the remainder are in equatorial positions. Particularly, the preservation of the structural integrity of the fucoidan molecules essentially depends on its method of extraction, which has an important significance for obtaining the relevant structural features required for specific biological activities based on its various structure-function relations.

Any suitable sulfated polysaccharide or other metabolite or reactant derived from freshwater algae or saltwater algae (seaweed) may be utilized in accordance with the present disclosure. Additionally, marine organisms such as sea cucumbers and sea urchins have been found to contain some levels of sulfated polysaccharides and other reactive metabolites, and as such, could potentially be utilized as a feedstock of the present disclosure. However, the fucoidan, the polysaccharides, and/or metabolites from the aforementioned marine organisms are not simple compounds; fucoidans are complex mixtures of many carbohydrate structures, and as such the present inventor has performed extensive research to determine their anti-fungal, antimicrobial, and antiviral effectiveness. Hence, due to the complexity of its chemical composition and structure, the difficulty in its extraction and processing, as well as the fact that its structures and chemical make up vary widely from species to species, industrial use and commercial viability have been largely limited until the discovery's set forth herein.

Particularly, the use of fucoidan has largely been limited for the production of oil based products, where isolation and extraction of its component parts is not of primary concern. For instance, the inclusion of complex carbohydrates, proteins, and lipids in the blade and/or air bladders of the algae make the extraction and processing of fucoidan difficult. Nevertheless, it has been determined by the inventor hereof that brown algae and various of its constituent components, when isolated and processed appropriately may be useful for many commercially viable products. Specifically, due to the research performed by the inventor herein, Fucoidan, and/or its compositional components may have many uses, such as for the production and use in foam, such as for the production of PU and/or EVA foam based products, including furniture padding and cushioning, shoe components, e.g., midsoles and insoles, as well as sheet materials, such as for use in cushioning mats, e.g., yoga mats, fire retardant materials, e.g., woven blends, and the like.

For instance, fucoidan and its constituents, such as various sulfates and other metabolites, may be derived from several different sources, such as from fresh water algae, e.g., green algae, or salt water algae, e.g., brown and red algae, as well as from other macro/micro algae, sea cucumbers, and sea urchins. For example, fucoidan can be extracted from crude raw materials, and may be purified by any suitable mechanism, such as ion-exchange chromatography, gel filtration, and/or by using a solvent, such as by water or other solvents, such as hydrochloric acid, calcium chloride, and/or acid/base extraction (particularly used for raw seaweed extraction). In particular instances, water may be used as a solvent, such as to maintain bioactivity, ensure a stable molecular weight, and maintain the charge of the various constituent polysaccharides and other metabolites.

Particularly, in an exemplary method for isolating and/or purifying fucoidan and/or various of its constituent components from algae, a first step may include growing and/or harvesting or otherwise collecting a quantity of the algae from its source, such as from the natural environment, a salt or freshwater pool, or other farm. Other steps may include one or more of crushing and/or further processing the algae so as to separate its cellular constituents from the structural matrix that forms the organism. The algal cells may then be dispersed and/or separated such as by agitation and/or by steaming in a high pressure, high temperature water container, such as from 80 to 90 degrees Celsius, such as for about 60 to about 90 minutes. Alcohol may optionally be added to facilitate the extraction and/or separation process. If alcohol is used, it may be removed after processing therewith, such as by an extraction tank. The resultant composition may then be filtered, concentrated, and purified.

Once isolated, the fucoidan may be dried and/or milled to a desired particle size. For instance, in various instances, various constituents or metabolites of ficoidan may be isolated and separated therefrom by one or more of these or associated processes, such as to isolate various sulfates, such as sulfated polysaccharides, sulfated galactofucans, sulfated galactans, other reactants or metabolites, and the like. In particular instances, once isolated, dried, and formed into a powder, the powder may be further processed so as to separate the powder into pre-selected size ranges, such as where the average particle size may have a diameter range from about 2 to about 12 micrometers, such as from about 4 to about 10 micrometers, for instance, from about 6 to about 8 micrometers, including a particle having a mean diameter of about 5 micrometers. Particularly, in some instances, the particulate composition may have a moisture content of about 0 to about 15%, such as from about 2 to about 12%, for instance, about 4 to about 10%, including about 5%.

Once in powder form, the ficoidan derived extracts may be blended with one or more agents, as described herein below, so as to be formulated into various constituents for the production of several useful products, including plastics and foams, personal health care products, cushioned furniture, clothing, including shoes, fire retardant products, and the like, which may then be used for the manufacturing of particular industrial and/or commercial products. Specifically, ficoidan derived batch product may be formulated into various foams such as PU or EVA foams, which may then be used to form various industrial and/or commercial products, such as cushioning for furniture, insoles, compressible sheeting materials, fire retardant materials, and the like. Additionally, it may be formed as a film or substrate and used for food packaging, such as to contact meat, it may be aerosolized and used as a foam based spray, and/or may be foamed and/or otherwise formed into a plastic.

Any of various species of red algae, brown algae, and brown seaweed (marine microalgae) are known to contain a high levels of fucoidan and sulfated polysaccharides with inherent antimicrobial properties, and can be used in various implementations of the subject matter described herein. An example of a beneficial algal-derived sulfated polysaccaride for use in some implementations is dried fucoidan powder. Fucoidan designates a group of certain fucose-containing sulfated polysaccharides (FCSPs) and is not found in terrestrial plants. It has a backbone built of (1→3)-linked α-l-fucopyranosyl or of alternating (1→3)- and (1→4)-linked α-l-fucopyranosyl residues, but also include sulfated galactofucans with backbones built of (1→6)-β-d-galacto- and/or (1→2)-β-d-mannopyranosyl units with fucose or fuco-oligosaccharide branching, and/or glucuronic acid, xylose or glucose substitutions.

There are at least two distinct forms of fucoidan: F-fucoidan, which is >95% composed of sulfated esters of fucose, and U-fucoidan, which is approximately 20% glucuronic acid. An additional non-limiting example of a suitable algal-derived antimicrobial compound of some implementations is sulfated galactan, which has been shown to be effective at inhibiting human bactericidal pathogens such as *Staphylococcus aureus, Salmonella enteretidis, P. aeruginosa, Enterococcus faecalis, Bacillus subtilis, Micrococcus luteus* and *Candida glabnata*. Any suitable sulfated polysaccharide derived from freshwater algae or seaweed may be utilized for incorporating the antimicrobial component into the flexible and/or semi-rigid, and/or rigid foams of the present disclosure.

The dried algae biomass of the present disclosure may be incorporated into various thermoset and/or thermoplastic resins to create a masterbatch for inclusion into a given flexible, semi rigid, or rigid foam composition prior to, during, or after foam expansion. Depending upon the application, other additives, e.g., foaming or blowing agents, pigments, and the like may be likewise added and utilized in the formulations as well. For foaming the flexible foams of the present invention various methods of open-cell or closed-cell cellular expansion may be utilized. For example, chemical-blowing agents such as Azodicarbamide may be used. Alternatively, a nitrogen expansion autoclave process may also be utilized for a less environmentally harmful foam expansion process.

This disclosure encompasses the methods to make an anti-agent (which can have activity against microbes, virus, bacterium, fungi, and protozoa) thermoplastic and/or foamed composite. The anti-agents are derived from multicellular algae or macroalgae in the phylums Chlorophyta, Rhodophyta, and Phaeophyta. The anti-agents may include metabolites such as polysaccharides, phenolics, alkaloids, terpenoids, fatty acids, steroids, other reactants or metabolites, etc. One such metabolite demonstrated is sulfated polysaccharides specifically from the class of polysaccharides known as fucoidan or metabolites. These fucoidans, and various isolated metabolites thereof, are known to exhibit anti-microbial, anti-fungal, anti-viral activity as well as fire-retardant properties, and can be used as feed supplements, and their activity is due to their composition.

These metabolites may be extracted or they may be in high enough concentration in the macrophyte for the macrophyte to be milled generating a metabolite rich meal (MRM). This metabolite rich meal can then be incorporated into a plastic and/or foam through at least two possible routes. The first is to feed the powdered extract or MRM into an extruder, such as a twin-screw extruder, via a feeder, and the feed powder may be fed into the polymer, copolymer, mixture which may have already been melted through the action of the screw. The second route adds the powder to a polar solvent with a low evaporation point creating a slurry. This slurry is then loaded unto microporous pellets using an applied vacuum to load them. The solvent is evaporated from the slurry under vacuum and a pellet is left which contains the powder incorporated into the pores. The fucoidan derived master batch powder may be added at any time during or after this process. In either case the resulting pellets can then be used to incorporate into any step of the plastic manufacturing process. Alternatively, a foaming process, as described above, may be implemented and the ficoidan derived master batch may be added during or after the foaming process. Both of these routes were demonstrated with the example metabolite described above called fucoidan.

As a metabolite with anti-microbial, anti-fungal, anti-viral, and in some instances, fire retardant, activity fucoidan can be incorporated into thermoplastics and open and closed cell foams in order to achieve composites with the anti-activities herein disclosed. For plastic production incorporation can be achieved via a twin-screw extruder with the feeding capability described above, operating with a temp profile between 180 and 90 C. A likewise process was employed for producing both open and/or closed cell foam materials. For the sake of demonstration, a 30% loaded fucoidan masterbatch was produced. A thermoplastic resin (in this test case a 28% VA content EVA) was gravimetrically fed into the upstream main screw feed and melted in the zones prior to the side feeder. The fucoidan was then gravimetrically fed into a side feeder which added the fucoidan to the molten polymer. The blend was then extruded air cooled and pelletized. The above was repeated, as explained previously, where the process was reconfigured so as to produce a foam material, where the fucoidan master batch is added during the foaming process, such as prior to an expansion step.

The resulting masterbatch pellets and/or foamed buns were tested for continued anti-microbial, anti-fungal, and/or anti-viral activity and found to remain active. No compatibilizers were used to incorporate fucoidan, but to achieve higher loadings a compatibilizer may be used and added in the main screw feed along with the thermoplastic resin. Suitable compatibilizers can be selected based on the thermoplastic resin used. The second route was also demonstrated on microporous polyethylene pellets sourced from Membrana GmbH. The fucoidan was reconstituted from a powder into a slurry with ethanol and then under an applied vacuum pulled into the microporous pellets with the ethanol being evaporated off. The pellets under cross section showed near complete coating of the internal surface with few zones not exposed.

To demonstrate a finished good carrying the anti-activity properties masterbatch pellets from the first route were blended with virgin thermoplastic resins to achieve concentrations from 3% down to as low as 0.1%. These blends were then used in bun foaming and injection molding processes. Finished articles from both conversion routes demonstrated the recited anti-activity via third party testing. The results showed measureable activity in all samples with industry requirements for anti-activity being met at as low as 0.5% loading. These test results demonstrated the potential available from macroalgal metabolites for anti-microbial, anti-fungal, and/or anti-viral activity.

This disclosure encompasses the methods to make an anti-activity (which can have activity against microbes, virus, bacterium, fungi, and protozoa) thermoplastic and/or foamed composite. The anti-agents are derived from multicellular algae or macroalgae in the phylums Chlorophyta, Rhodophyta, and Phaeophyta. The anti-microbials may include metabolites such as polysaccharides, phenolics, alkaloids, terpenoids, fatty acids, steroids, etc. One such metabolite demonstrated is sulfated polysaccharides specifically from the class of polysaccharides known as fucoidan. These fucoidans are known to exhibit anti-microbial activity as feed supplements and their activity is due to their composition.

These metabolites may be extracted or they may be in high enough concentration in the macrophyte for the macrophyte to be milled generating a metabolite rich meal (MRM). This MRM can then be incorporated into a thermoset plastic through a treatment process followed by blending into liquid polymer precursors before reacting. The thermoset plastics of interest may include urethane based, acrylate based, epoxide based, ester based, imide based, phenol based, formaldehyde based, silicone based, etc. The foamed precursors of interest may include PU and/or EVA foams. The thermosets typically begin as liquid precursors that are mixed to crosslink, undergo condensation and/or expansion reactions to form, or use some other action that starts as a liquid precursor to form thermosets. Two such commonly used thermosets in industry are flexible and/or semi-rigid polyurethane and/or EVA foams. Accordingly, in part, what is herein disclosed is a method to incorporate anti-microbial, anti-fungal, and anti-viral metabolites from macroalgae in the demonstration thermoset of flexible polyurethane and/or EVA foams. In certain embodiments, algae containing compositions and their byproducts set forth herein may also exhibit fire retardant properties.

Beneficial metabolites from macroalgae are often found alongside organic salts formed by macroalgae due to their common existence in high salt concentration environments. The organic salts remain with the metabolites after washing macroalgae due to their occurrence within algae cells, and milling and/or extraction processes used will often times leave organic salts with metabolites due to their similar solubility. These organic salts present challenges in thermoset reactions which often use Group 1 organic salts or hydroxides as catalysts. For example, polyurethane is known to use potassium based organic salts such as potassium octoate and potassium acetate, acrylate based thermosets are known to use sodium carbonate and sodium phosphate as catalyzing agents, silicone use sodium and potassium hydroxide as curing catalyst, etc. As such these organic salts often need to be removed from the macroalgal metabolites to achieve controlled thermoset reactions that incorporate the metabolites. Removal is useful when thermoset reactions cannot be controlled with the naturally derived catalyst present.

In order to remove these organic salts the MRM must first be reconstituted in a polar solvent with a boiling point below 120 C. The metabolites can then be separated via at least three possible routes. The first route requires the use of electrophoresis to pull the cationic species away from uncharged or very slightly charged and much larger macroalgal metabolites. The second route uses separation columns specifically ion exchange columns to separate ions in salts from the metabolites of interest. The third route uses membranes to separate ions from metabolites on the basis of size or charge. While all three routes would lead to an appropriate separation of the metabolites from salts the second route is demonstrated due to the scalability and economics of column separation techniques.

The column extraction is demonstrated using the example metabolite of fucoidan which contains almost 10% cationic species by dry weight. The fucoidan MRM is dissolved in a water/ethanol solution with 10% to 20% ethanol. This solution is then added to an adequate ion exchange column for cationic species removal. An adequate column would include a cationic ion exchange resin with the protic form which would remove any organic salt catalysts and replace them with weak acids. The resins used for demonstration include Amberlyst 15 and Dowex 50WX8. This technique is repeatable in a batch commercial processes since columns can be regenerated easily with strong acids such as sulfuric acid between successive extractions.

After column extraction is complete all cationic species have been removed and the metabolites are in solution and need to be re-dried into a dry powder. The re-drying can occur via any commercially available drying technique that keeps temps below 100 C. For demonstration purposes vacuum drying was used. The final dry powder can then be incorporated into thermoset plastic precursors in preparation for crosslinking. In order to adequately disperse the dry anti-agent powder in the plasticisable and/or fomable liquid precursors a dispersion aid is often required. The selected dispersion aid will depend on the thermoset conversion route of interest. In the demonstration case of flexible polyurethane foam Disperbyk 185 was selected to adequately disperse the fucoidan in the polyol precursor. Other dispersion aids can be selected from commercially available dispersion aids for polar pigment concentrates to properly include metabolites in thermoset precursor solutions. After dispersion in the liquid precursor normal crosslinking reactions can proceed forming the finished thermoset material with anti-agent properties inherent to the macroalgal metabolite.

Accordingly, in some implementations, an antimicrobial, anti-fungal, anti-viral plastic and/or foam composition having the recited anti-activity compound dispersed, e.g., uniformly, in the plastic and/or foam is provided. In certain embodiments, the anti-activity compound may be dispersed in a liquid precursor, such as a crosslinking plastic precursor. For instance, in particular embodiments, the anti-activity compound may be produced by macroalgae, which may be present from about 0.1 or 1% to about 50% of the composition by weight, such as where the plastic or foam component(s) may be about 50% to about 99% of the composition. Particularly, in certain implementations, the loading range may range from about 0.1% to about 70%, such as from 1% to about 50%, including about 10% to about 35%, and the cross-linked plastic and/or foam may be in the range of about 25% to about 99.9% of the composition. In some embodiments, the plastic and/or foam may be a crosslinked polymer, thermoset polymer, and/or a cross-linked foamable copolymer.

In certain embodiments, the dry, anti-activity MRM powder product may be added during the mixing process, such as into the precursor solution, e.g., through the action of industrial batch mixing equipment, which may be included and dispersed through out with the aid of one or more dispersants, e.g., such as a dispersant for polar pigments. Additionally, in various instances, the crosslinked or thermoset polymer includes but is not limited to acrylate, imide, ester, epoxies, silicone, phenol, a di- or polyisocyanate, a polyol, a urethane, a polyurethane, ethylene, a vinyl acetate, an ethylene-vinyl acetate, a formaldehyde, and epoxide based polymers which may be crosslinked in liquids, such as via condensation, free-radical, or reaction polymer methodologies, such as those disclosed herein above. Further, as indicated, the anti-activity compounds may be metabolites produced by the macroalgae, which may be harvested, in accordance with the methods herein described, through extraction and/or milling of the raw biomass. Specifically, in particular embodiments, the MRM powder may include, but is not limited to, polysaccharides, phenolics, alkaloids, terpenoids, fatty acids, steroids, and/or other fucoidan derived metabolites, etc. Further, as indicated above, in various instances, the anti-activity MRM powder may be treated to remove salts, such as through a separation technique, such as using size or ion exclusion membranes, ion exchange columns, and/or electrophoresis, such as using ion exchange columns employing cationic exchange resins.

Particularly, in accordance with the methods herein disclosed may be employed so as to produce one or more of a flexible, semi-flexible, semi-rigid, and/or rigid foamed article, such as used to make a foamed sheet or block. Additionally, in various embodiments, the anti-activity composition mixture may be a coating that may be applied, e.g., via aerosolized spraying, so as to coat an article of manufacture. Further, in various embodiments, the composition may be formed as an adhesive.

More particularly, in a particular implementation, and without imparting limitations to the disclosure herein, a flexible or semi-flexible foam formulation may include one or more of the following: a dried algae biomass, PU and/or EVA polymer, e.g., an EVA polymer having about 18% VA content, a dicumyl peroxide, an zodicarbamide, a zinc oxide, a zinc stearate, and/or a fucoidan powder or derivative thereof. For instance, in certain embodiments, the MRM polymer composition may include one or more of the above components in the following relative ranges: such as a dried algae biomass in a range of about 10% or less to about 50% or more, such as from about 15% or about 20% to about 40% or about 45%, including about 25% to about 35%, including about 30%. The copolymer component may be present in a range of about 50% or less to about 95% or more, such as from about 55% or about 60% to about 85% or about 90%, including about 65% to about 75%, including about 70%.

Further, a carbonate, e.g., CaC03, and/or a azodicarbamide, and/or a peroxide, e.g., dicumyl peroxide, may be present individually within a range from about 1% or less to about 10% or more, such as from about 3% or about 4% to about 7% or about 8%, including about 5% to about 6%, including about 2%. Additionally, an Oolitic Aragonite, may be included in substitution for or in conjunction with the carbonate. For instance, the composition may include from about 0.01% to about 40%, such as from about 1% or 5% to about 30% to about 35%, for example, from about 10% or about 15% to about 25% to about 30%, including about 20% Oolitic argonite. Specifically, the Oolitic aragonite is a mineral that may be composed of from about 70% to about 98% sand rich in carbonate content derived from aquatic blue/green algae. Particularly, in various instances, coridacean algae, e.g., blue-green algae, produces a calcium carbonate exoskeleton, e.g., argonate, in their boundary layer that is deposited as the algae alters its local environmental pH to a level that is more conducive to sustainable algal proliferation.

More particularly, Oolitic aragonite is a marine cement byproduct of the photosynthetic activity of the various algae set forth herein which produces a net surplus of oxygen, which shifts aquatic pH levels upwards, such as in environments where such surplus may be contained, such as by the semi-permeable membrane of a coral polyp or in the minuscule dead water layer surrounding submerged objects. In the right conditions this rise in pH results in a body of sea water that is supersaturated with cyanobacteria and/or algal derived exo- and/or endoskeletons that are rich in carbonates, such as calcium carbonates, which in turn results in the precipitation of aragonite. For instance, the eroded skeletons of corals, cyanobacteria, and/or algae, e.g., Halimeda coridacean and/or blue/green algae, comprise the majority of aragonitic reef sand grains in the 1 to 4 mm range. Particularly, Oolitic aragonite may be formed either as a direct chemical precipitate from sea water or by the mediation of a microscopic coating of blue-green bacteria/algae. Accordingly, in various embodiments, a composition of the disclosure may include naturally occurring Oolitic aragonite that is isolated and size distributed so as to be composed of about 1 micron to about 10 micron crystals. In various instances, the aragonite may be synthesized by adding a calcium chloride solution to a sodium carbonate solution at temperatures above 60° C. (140° F.) or in water-ethanol mixtures at ambient temperatures.

For example, aragonite is a naturally occurring carbonate mineral having a crystal forms similar to calcium carbonate, $CaCO_3$, or mineral calcite. It is formed by biological and physical processes, including precipitation from marine and freshwater algae and/or coral containing environments. Particularly, in various instances, Oolitic aragonite may be generated through the mineralization of Carbon Dioxide ($CO_2$) to Calcium Carbonate ($CaCO_3$) within natural occurring blooms of algae, phytoplankton, and/or coral. Oolitic aragonite, when isolated may typically include from about 85% or about 90% to about 95% or 97% or about 99% $CaCO_3$; about 0.01 or about 0.5% to about 1% or about 2%, including about 1.5% $MgCO_3$; about 0.01 or about 0.08% to about 0.2% or about 1% SiO; about 0.001 or about 0.008% to about 0.02% or about 0.03%, including about 0.025% $Fe_2O_3$, about 0.01% or about 0.05% to about 0.1% or about 0.2% $SO_3$; about 0.01% or about 0.06% to about 0.2% or about 0.3%, including 0.25% NaCl; about 0.1% or about 0.3% to about 1% or about 2% including about 1.25% SrO; and/or about 0.01 or about 0.02% to about 0.2% or about 1% $Al_2O_3$ all of which may be isolated, purified, and used individually or collectively within a composition of the present disclosure, such as a filler or other additive.

In particular instances, Oolitic aragonite may be produced by picoplankton, such as by Cyanobacteria and unicellular blue and/or green algae. More particularly, photosynthesis drives the engine of carbon sequestration by cyanobacteria and/or algae, such as by reducing $CO_2$ to organic compounds at the same time producing Oxygen ($O_2$) through the Calvin-Benson-Bassham cycle. Next generated $CO_2$ may be mineralized to recalcitrant carbonates, such as calcium carbonate ($CaCO_3$). Both cyanobacteria and algae have a carbon dioxide concentrating system that allows cells to raise the concentration of CO2 at the site of the carboxylating enzyme rubulose up to 1,000 times the surrounding medium. This results in the excretion of the organic polymeric substances, e.g., aragonites, that form extracellular formations. These exopolymeric substances serve as a nucleation surface for mineralization and aragonite formation.

Aragonite's crystal lattice differs from that of calcite, which results in a different crystal shape, such as in an orthorhombic system with acicular crystals. Repeated twinning results in pseudo-hexagonal forms. Hence, although aragonite and calcite have the same chemical formula (CaCO3), each belongs to a different crystal system and each has different physical and chemical properties. Dolomite is similar in structure to calcite except that layers of calcium alternate with layers of magnesium. Differences between these minerals include differences in density (aragonite 2.93; calcite 2.71; and dolomite 2.8-2.9), solubility, buffering capacity, Zeta potential, crystal morphology, trace element composition, surface area (oolites), and brightness. Aragonite may be columnar or fibrous, occasionally in branching stalactitic forms called flos-ferri. Further, although aragonite is metastable at a pH of 8.2, at greater pH it may begin to dissolve into its constituent ions of Ca++ and CO3, while calcite, derived from crushed coral, begins to dissolve somewhere in the mid 7's.

Naturally occurring aragonite contains substantial amounts of the larger ionic radius+2 cations such as strontium (up to 10,000 ppm) which may be released as the substrate dissolves, which may facilitate the inorganic precipitation of aragonite when in solutions containing sodium and magnesium, e.g., like sea water, which promotes growth of aragonitic producing aquatic organisms, such as algae, thus producing a positive feedback production cycle. Oolitic aragonite, therefore, amasses at the bottom of particular regions of the sea floor, such as in the Bahamas, where Oolitic aragonite sands may be dredged, isolated, processed, purified, and/or size distributed. Such Oolitic aragonites have high intercrystalline porosity that significantly enhances the reactivity of the carbonate sorbent by exposing a much greater surface area. Specifically, Oolitic aragonite sand may be dredged and/or otherwise isolated from various tropical waters, such as from the Bahama Banks, which is composed largely of calcium carbonate Oolitic aragonite sand material that naturally forms through the precipitation and sedimentation processes as described above. In such instances, the isolated sand may contain about 92-98% pure calcium carbonate.

Unlike calcite, aragonite continues to react chemically with sea water after acquiring an algal biofilm coating, which has been determined to give aquatic produced aragonite enhanced properties over calcite and/or other forms of naturally non-aquatic produced carbonates. These and other physical properties of the material can be enhanced by close grading so as to allow for more interstitial water per volume, and by manipulating the surface area to volume ratio which states that if grain size is uniform, the surface area as a function of volume increases as the grain size diminishes. Additionally, performance can also be increased by technological means including processing via a calcium reactor or an eco-sand plenum system.

Furthermore, the composition may include one or more of an oxide, e.g., a zinc oxide, a stearate, e.g., a zinc stearate. Additionally, as indicated, a fucoidan powder may be individually present such as in a range from about 0.01% or less to about 5% or more, such as from about 0.1 or about 0.5% or about 1% to about 3% or about 4%, including about 1.5% to about 2.5%, including about 2%. More particularly, in one particular embodiment, the composition may include about 22-25% dried algae biomass, 67%-70% PU and/or EVA polymer, about 4-5% CaC03, 4-5% dicumyl peroxide, about 3-4% Azodicarbamide, about 0.4 or 0.5% zinc oxide, 0.4 or 0.5% zinc stearate, and/or about 0.5 or about 1.5%, e.g., about 1% fucoidan powder or derivative thereof. In various instances, the composition may include Oolitic aragonite, or one of its constituent parts, such as in a range from about 0.01% to about 40%, such as from about 1% or 5% to about 30% to about 35%, for example, from about 10% or about 15% to about 25% to about 30%, including about 20% Oolitic argonite. Accordingly, in various embodiments, a PU and/or EVA foam may be produced, in accordance with the methods disclosed herein, wherein the PU or EVA foam include a CaCO3 additive or filler derived from Oolitic aragonite, which may be a blue-green algae derived CaCO3.

In other instances, based on 100 parts by weight of polyol, about 15 parts of algae powder or about 20 parts of algae powder may be included. For instance, about 15-20% of the polyol portion will be made up of algae. As indicated, the algae powder component may be derived from a macroalgae, such as a multicellular species of algae from one or more of phylums Phaeophyta, Chlorophyta, and Rhodophyta, among others. In certain instances, the algae based anti-microbial, anti-fungal, and/or anti-viral compounds may be metabolites or reactants produced by the macroalgae, which may be harvested through extraction from raw biomass. For example, the metabolite may be one or more of polysaccharides, phenolics, alkaloids, terpenoids, fatty acids, steroids, etc.

In various instances, the solvent for making solutions is a polar solvent suitable for removing the macroalgal extracts into a solution or suspension. For instance, in certain instances, the solvent solution is polar and has a boiling point below 120° C., e.g., to enable low temp drying, has an evaporation temp below 80° C. Once extracted and processed the algae powder may be added into the formula with the polyol component. In various instances, the combination method may be by extrusion compounding, such as extrusion compounding that may be performed by a twin screw extruder, such as with a polymer that has a melting point below 200° or 250° C. In particular embodiments, the composition takes on the form of a pellet and may be used in a further product conversion process.

In certain instances, the algae powder may be dried such as at temperatures below 100° C. and includes but is not limited to vacuum drying, microwave drying, freeze drying, spray drying, etc. The dried algae powder may have an average particle size of about 50 to about 100 microns, such as about 60 to about 90 microns, including about 70 to about 80-micron. It is further to be noted that during the formulation process the algae portion may increase the cure rate, thereby decreasing curing times, as cross-linking reactions are more easily achieved. In some instances, loading levels of less than 20 part of algae powder may yield particularly useful results. Further, the temperature for the foaming may range from about 100° C. to about 250° C., such as about 125° C. or 150° C. to about 175° C. or about 200° C., such as 220° C. during processing. In certain instances, the algae based compounds may have a thermal degradation point greater than 130° to above 230° or 250° C.

Accordingly, the resulting plastic and/or foam may be a synthetic and/or plant derived polymer. In one embodiment, the synthetic polymer includes but is not limited to polyethylene, polypropylene, polystyrene, polybutylene adipateco-terephthalate, polybutylene succinate, polyethylene terephthalate, polyethylene vinyl acetate, etc. In other instances, the plant polymer includes but is not limited to thermoplastic starch, cellulose acetate, plant proteins, polylactic acid, etc. In various embodiments, the plastic and/or foam may be derived from a solution application to a microporous plastic and/or foam pellet, such as where the microporous pellet may be a plastic or foam pellet with pore sizes between 10 microns and 150 microns or more, such as a microporous pellet having a melting point below 200° C. In some instances, the composition pellet may be used to make a foamed article, such as furniture, cushions, shoe components, e.g., insoles, thin sheet mats, e.g., yoga mats, and/or fire retardant materials. In other instances, the composition may be used to make a fiber, film, and/or profile extruded article, and in various other instances, the composition may be used to make an injection molded or roto-molded article.

Further, as indicated, depending on the formulation and the given application, lower or higher concentrations of the dried algae biomass content may offer various benefits, such as anti-microbial, anti-fungal, anti-viral, and/or flame retardancy, and in some embodiments may be included so as to make the underlying product more sustainable, more green, and more environmentally friendly. For instance, a plastic and/or foam produced in accordance with the methods disclosed herein, and containing one or more algae components as herein described, may include anti-microbial, anti-fungal, anti-viral, and/or flame retardant properties, such as where the underlying foam plastic and/or foamed produced may be a flexible, semi-flexible, semi-rigid, or rigid open or closed cell foam, such as a PU and/or EVA foam.

In various embodiments, depending on its use in context the terms "anti-activity" or "flame retardant" or fire retardant" may be used herein as presenting a feature or quality in which an initiation and/or spread of microbes, bacteria, fungus, viruses, and/or flame or smoke is slowed or prevented entirely by inhibiting the spread and combustion reaction in the flame. Specifically, with respect to flame retardancy, the dried algae biomass contains a significant mineral content that can be employed to abate flame or fire. Accordingly, in various embodiments, the dried algae biomass may be added into the foam formulations of the present implementations, such as in concentrations higher than 25 10-25%, such as 25 parts per hundred, more or less, that the dried algae biomass homogenizes and fuses with the carrier resin, thereby acting as a flame and fire inhibitor. Effectively, the dried algae biomass that is homogenized into flexible foam acts as a thermal barrier and diffusion barrier.

Further, in various instances, presented herein are algae-derived antimicrobial fiber substrates, and a method of making the same. Such fibers may be employed in the manufacture of textiles, such as for the production of upholstery, such as for furniture, curtains, clothing, e.g., fire-retardant clothing, bed spreads, sheets, blankets, carpets, and the like. As a feedstock, algae and algae derived byproducts, and/or the metabolites thereof are a suitable solution for making antimicrobial fiber substrates due in part to its significant abundance worldwide. In addition to significantly inhibiting bacteria growth without harm to human health, algae offer many environmental benefits for use in manufacturing antimicrobial fiber substrates, such as requiring no pesticides to grow, sequestering $CO_2$, and not adversely affecting the environment.

Hence, in accordance with some implementations, a process of manufacturing algae-derived flexible foams, whether open-cell or closed-cell, with inherent antimicrobial, anti-fungal, anti-viral, and/or flame resistant properties, includes the steps of: harvesting algae-biomass; sufficiently drying the algae biomass; blending the dried algae biomass with a carrier resin, and various foaming ingredients; adding an algal-derived antimicrobial compound selected from various natural sulfated polysaccharides or other metabolites present in brown algae, red algae, and/or certain seaweeds (marine microalgae); and adding a sufficient quantity of dried algae biomass to the formulation to adequately create a suitable anti-activity and/or fire resistant flexible foam material.

Particularly, fucoidan and/or its extracts may be added to various compositions such as to impart anti microbial, anti fungal, anti viral, and/or flame retardancy properties thereto, such as to inhibit threatening growth, spreading, and/or fire. For example, fucoidan and various of its extracts have been shown to reduce about 80 to about 99% of the growth of gram positive and/or gram negative bacterial growth, such as *Staphylococcus aureus* and *Escherichia coli* as well as having anti-viral and flame retardancy characteristics. In such instances, the fucoidan or a metabolite thereof may be part of the underlying composition or may be coated onto a surface of the product such as via a suitable treatment process. In particular instances, fucoidan and/or its extracts, such as sulfated polysaccharides, sulfated galactofucans, and/or sulfated galactans may be added to a composition, such as during a fabrication process, or to a surface of a finished product, such as after fabrication so as to add anti-microbial properties thereto.

Hence, in various embodiments, an anti-activity and/or flame retardancy powder, such as derived from algae, containing a fucoidan extract or metabolite, such as a sulfate, such as a sulfated polysaccharide, sulfated galactofucans, sulfated galactans, and/or the like, may be provided, such as to a composition, such as during a fabrication process, so as to depart antimicrobial properties to the underlying article of manufacture. Particularly, such anti agents may be included in the fabrication of various plastics and foams, so as to depart antimicrobial properties thereto. In such instances, plastics and/or foams fabricated in the manners provided herein have several advantages over those not containing or otherwise contacted with the ficoidan and/or its extracts, which include non-clumping, non-agglomeration, and wont separate out of solution during the fabrication process.

For instance, during the fabrication process a liquid comprising one or more of the reactants disclosed herein and/or a plastic precursor and/or a block copolymer may be added, e.g., along with a compatibilizer, to the reaction mixture such as for the production of a plastic. More particularly, most plastics contain organic base units that form repeating polymers. In most instances, these polymer units are based on chains of carbon (or silicon) atoms alone, but may include oxygen, sulfur, or nitrogen as well. The backbone is that part of the chain on the main "path" linking a large number of repeat units together. Additives can be added in a manner so as to be branched or otherwise hung off a portion of a monomer unit, such as prior to it's forming of a polymer complex, so as to customize the properties of the plastic. For example, in various instances, an additive may be added to a monomer solution, prior to further processing of the solution, such as prior to the monomers being linked together to form the polymer backbone chain. The structure of these "side chains" may be designed so as to influence the properties of the polymer. Hence, in various instances, this fine tuning of the repeating unit's molecular structure influences the properties of the polymer and/or the plastics formed thereof.

Accordingly, various antimicrobial agents, such as fucoidan or its derivatives may be added during the fabrication process in such a manner that the resultant plastics and/or foams contain these organic, and in some instances other inorganic, compounds that have been blended therein. The amount of the fucoidan and/or other additives may range such as described herein and above, but in some particular instances, may range from less than a percent, e.g., 0.5% or less, to five or ten percentage (for example in polymers used to wrap foods) to more than 50% for certain cosmetic and/or foam related applications. The average content of such additives may be about 2 to about 20% by weight of the polymer. Hence, a typical plastic or foam may be formulated from a carbon or silicon containing base product, which may be reacted with other various chemical elements, such as hydrogen, oxygen, nitrogen, chlorine, and sulfur, as described herein. The carbon and/or silicon atoms may form up to four bonds with other constituents in such a manner that long strings or chains having a carbon backbone may be formed, and in some instances may form thermoplastics, such as where the plastic includes repeat units containing identical sub-units called monomers, and in some instances may form a foam material, such as a PU and/or EVA foam.

Specifically, with respect to the production of plastics, such repeating monomers or polymer units may be any suitable length so as to make a stable molecule, and in some instances may be only one carbon, e.g., with two hydrogens, in length, such as for polyethylene, to repeating monomers of 38 atoms in length, such as for nylon, and even more for other plastics. For instance, the formation of the repeat units, such as for thermoplastics may begin with the formation of small carbon-based molecules that can be combined to form monomers. The monomers, in turn, are joined together by chemical polymerization mechanisms to form polymers. These monomers are then chemically linked bonded into chains called polymers.

There are two basic mechanisms for polymerization: addition reactions and condensation reactions. For addition reactions, a special catalyst may be added, frequently a peroxide, so as to increase the speed and extent of the reaction, such as by causing or otherwise enhancing the ability of one monomer to bind or otherwise link to another and to the next and that to the next and so on, such as to form a string or chain of monomers. Such polymerization through addition may be used for the production of long chain polymers, including polyethylene, polystyrene, and polyvinyl chloride among others, without the creation of byproducts. In various instances, addition polymerization reactions are typically carried out in a gaseous phase, such as where the reactant monomers are dispersed in a liquid phase.

The second polymerization mechanism, condensation polymerization, also uses catalysts so as to have all the (single-unit cells) monomers present within a mixture of reactants to react with adjacent monomers so as to form dimers (e.g., two-unit cells). This reaction produces building blocks of two monomer cells that form dimers plus a byproduct. These dimers can then combine to form tetramers (four unit cells), which can then combine, and so on. For condensation polymerization the byproducts must be removed for the chemical reaction to produce useful products. Polyesters and nylons are typically made by condensation polymerization.

Further, when a connection or linkage between the carbon atoms is produced, a one dimensional chain of repeating building blocks (e.g., monomers, dimers, tetramers, etc.) is formed, so as to generate a chain of repeating unit cells. However, in various instances, two and/or three-dimensional networks may form, given the right fabrication conditions, instead of one-dimensional chains. In such an instance, the polymer that forms is a thermoset plastic, such as an epoxy or adhesive, which is characterized by not being meltable. In either instance, the polymer building blocks may be homopolymers or copolymers.

For instance, if the long chains show a continuous link of carbon-to-carbon atoms, e.g., of the same repeating monomer building blocks, each building block is called a homopolymer and forms a structure that is homogeneous. In such an instance, the long chain is called the backbone. Polypropylene, polybutylene, polystyrene and polymethylpentene are examples of polymers with a homogeneous carbon structure in the backbone. However, if the chains of carbon atoms are intermittently interrupted by other elements separating one carbon in the backbone from another, such as oxygen or nitrogen, the structure is called heterogeneous. Polyesters, nylons, and polycarbonates are examples of polymers with heterogeneous structure. Heterogeneous polymers as a class tend to be less chemically durable than homogeneous polymers.

As discussed herein, in various instances, different elements can be attached to the carbon-to-carbon backbone. For instance, one or more chemical elements may be added to the reaction mixture so as to enhance or otherwise modify the properties of the underlying plastic formed during the fabrication process. For instance, chlorine can be added during the reaction phase so as to produce polyvinyl chloride (PVC), which contains attached chlorine atoms. Additionally, fluorine can be added to the reaction mixture so as to form Teflon, which contains attached fluorine atoms. Likewise, in various instances, fucoidan, or one of its derivatives, e.g., sulfates, may be added to the reaction mixture, so as to make a plastic having or otherwise exhibiting antimicrobial properties.

In particular instances, how the links in the formation of the plastics, e.g., thermoplastic or otherwise, are arranged can be controlled so as to change the structure and properties of the underlying plastics, such as to modify the functionality of the products derived from the formulated plastics, such as to add antimicrobial properties thereto, such as by adding a fucoidan extract, e.g., sulfated polysaccharides, sulfated galactofucans, and/or sulfated galactans, during the reaction phase, or thereafter, to the forming or formed plastic, which can then function to depart antimicrobial properties to the plastic and/or a product produced from the resultant plastic. More particularly, some plastics are assembled from monomers such that there is intentional randomness in the occurrence of attached elements and chemical groups. In such an instance, fucoidan or a derivative thereof, may be added to the other various reactants during the fabrication process, so as to add one or more extracts, e.g., sulfonates, to the underlying carbon backbone or a branched chain thereof. So as the attached groups occur in a predictable order.

In other instances, the reaction may take place in such a manner so that the groups to be attached occur in a more randomized order. For example, once the fucoidan and/or one of its derivatives are isolated, dried, and formed into a powder, and/or the powder is processed into pre-selected size ranges, the powder may be added to the reaction mixture in such a manner that as the plastic monomers link to form the structural backbone the fucoidan element is incorporated into the underlying fabricated plastic. In alternative instances, the fucoidan extract may be formulated so as to be added to, e.g., coated upon, the finished plastic, such as after its fabrication.

In various instances, in the production of plastics or foams, the reaction process and timing during which the various reactants are added to the reaction mixture, along with their concentration, may allow for the resultant plastic or foam product to be specifically designed. For instance, by adjusting the spatial arrangement of atoms on the backbone chains, the plastics manufacturing process can change the performance properties of the plastic. Additionally, the chemical structure of the backbone or framework, the use of the different types of copolymers, and the chemical binding, e.g., cross-linking, of different elements and compounds to a backbone, and the use of crystallizability can change the processing, aesthetic, performance, and other properties of plastics and foams. The plastics and/or foams can also be altered by the inclusion of one or more additives, such as those herein described.

For example, when plastics and/or foams emerge from the fabrication reactors in which they are produced, they may or may not have the properties desired for a commercial and/or industrial product. Particularly, dependent on the use to which these various products are to be used, it is often beneficial for them to have particular antimicrobial properties, such as properties that would allow the underlying product to exhibit anti-bacterial, anti-fungal, anti-viral, and/or fire retardant properties, such as properties that kill or otherwise prevent the growth and/or accumulation of harmful agents, such as deadly, injurious, and/or odor producing bacteria, funguses, and/or viruses, which may also extend various anti-flammable properties to the product. More particularly, as described herein, various additives, such as fucoidan and various of its extracts and/or metabolites may be added to a reaction process, or to a finished product, so as to reduce about 80 to about 99% of the growth of gram positive and/or gram negative bacterial growth, such as *Staphylococcus aureus* and *Escherichia coli* as well a hepatitis, herpes, CMV, and other STD viruses.

In such instances, the fucoidan may be part of the underlying composition or may be coated onto a surface of the product such as via a suitable treatment process. In particular instances, fucoidan and/or its extracts, such as sulfated polysaccharides, sulfated galactofucans, and/or sulfated galactans may be added to a composition, such as during a fabrication process, as described herein, or to a surface of a finished product, such as after fabrication so as to add anti-microbial and/or anti-viral and/or anti-flammable properties thereto. Accordingly, in various instances, various additives may be included in the fabrication and/or manufacturing process so as to impart specific properties to plastics.

For instance, some of the monomers and/or polymers produced in accordance with the methods disclosed herein may incorporate additives during the manufacturing process. Other polymers include additives during processing into their finished parts. Hence, various additives, such as the fucoidan and/or its derivatives described herein, may be incorporated into the monomer and/or polymer production process so as to alter and improve the basic physical and/or chemical properties of the underlying products derived from the use of such plastics, such as in the manufacturing process. These additives may be used to protect the polymer and/or resultant plastics from the degrading effects of light, heat, bacteria, viruses, and/or may be used to change such polymer processing properties such as melt flow, and/or to provide special characteristics such as improved surface appearance, reduced friction, and flame retardancy to the underlying product. Accordingly, in particular embodiments, these algae derived materials may be supplied as powders, as described herein, for instance, at levels of about 1 or 2% to about 30 or about 40%, such as about 4 or about 5% to about 20 or about 25%, for instance, about 8 to about 15%, including about 10% based on the weight of the finished product.

For instances, in various embodiments, a foamed material may be produced where the foam material may have one or more anti-microbial, anti-bacterial, anti-fungal, anti-viral, and/or anti-flammable properties, such as where the foam materials may be used in the production of cushions, cushioned furniture, shoe components, such as insoles thereof, mats, fibers, weaves, and the like. Other useful products may include caulking, such as silicone caulking, silicone medical gloves, silicone tubing for drug delivery systems, silicone adhesives, silicone lubricants, silicone paints, and other suitable silicone products, e.g., condoms, that include algae components imparting various types of antimicrobial and antifungal and fire retardant properties to the underlying articles of manufacture.

More particularly, in one aspect, this disclosure may be directed generally to a process for the manufacture of furniture, such as upholstered furniture, such as employing algae derived fibers disclosed herein, and/or the cushions thereof, such as furniture that includes or is otherwise comprised of foam, e.g., PU or EVA foam. Particularly, the PU or EVA foam of the disclosure is advantageous for use in the manufacture of furniture that includes foam inserts. Hence, in various instances, novel methods for making foam cushions and other foam cushioned articles of manufacture, are provided, such as where the articles of manufacture include a percentage by weight of algae mass, such as less than about 1% to about 85% or more, such as about 10% or about 15% to about 60% or about 70% or even about 75%, including about 20% or about 25% to about 35% or about 45%, including about 50%.

Specifically, elastic polyurethane, flexible ethylene vinyl acetate, and other resin foams have proven to be advantageous for use as cushioning materials, such as for pillows, couches, beds, seat cushions, or for other upholstering furniture, and the like. For instance, in accordance with the methods disclosed herein above, a mold of a small to large block of foam can be produced, such as to form the PU or EVA foam insert. The block foam may then be cut into smaller blocks of the desired size and shape, based on the type and form of the furniture being produced. Specifically, the sized and cut blocks may then be applied to or otherwise fit within the furniture frame or bounding material, together which may be covered to produce the final furniture product, whether it be a pillow, sofa, a cushion, e.g., a sofa or car cushion, or the like. Additionally, where desired, an outer casing or bounding material may be attached to the frame material, such as by stapling, and/or tacking, or otherwise fastened to the frame of an article to be upholstered and covered with a fabric or other material.

Accordingly, in various embodiments, when manufacturing upholstered furniture, such as a couch, a frame may be produced. Various internal, e.g., structural, components of the furniture may be installed within the frame, such as springs or the like, and then the PU and/or EVA sheets, produced in accordance with the methods disclosed herein above, may be positioned in, over, and around the springs, such as for cushioning and/or insulation. Of course, other materials may be included, such as layers of cotton, wool, felt, rubber-based products, and the like, and a cover material may then be added so as to cover the frame and finish the product manufacture. Specifically, the PU and/or EVA foam and/or other materials may function as padding, or filling, which may be shaped, adjusted, and tucked beneath a cover as the cover material is stretched over the frame. Additionally, as indicated, in various instances, a portion of the PU and/or EVA foams used in these regards may be produced in such a manner so as to include a lesser or greater amount of algae mass, which may be beneficial for a number of reasons, not the least of which is the fact that typical PU and/or EVA foams are not in any manner bio-degradable, whereas the algae component of the foams produced herein are, and in various instances, the algae component may provide anti-activity properties and/or flame retardance to the foam component, as well as making them more environmentally friendly.

Hence, in various embodiments, a method of constructing furniture upon an open frame is provided. For instance, in one instance, the method may include one or more of the following steps. Particularly, the method may include providing a frame, the frame defining back, a plurality of side walls, and seat portions, such as where the back frame portion is extended substantially vertically and the seat portion extends substantially horizontally, relative to one another, in a manner such that the seat portion transects the vertical portion. The method may further include cutting a flat sheet of PU and/or EVA foam to appropriate size and shape to provide padding for the back and seat and/or side wall portions, cutting flat cover material to appropriate size and shape to finish the back, seat, and/or side wall portions, attaching the PU and/or EVA foam sheets and the cover material together at spaced positions and compressing the foam to form a contoured predetermined design in the outer surface thereof, and to form a substantially flat sub-assembly wherein the foam sheet and cover material are free for relative movement intermediate the positions of attachment, and shaping and attaching the sub-assembly to the frame.

Essentially any foamable thermosetting or thermoplastic resin composition can be employed to form the cushion or cushioned article. However, in various instances, the foamable resin may be a PU or EVA foam material. As described herein, such PU and/or EVA foamable resin compositions may include a relatively predominant proportion of resin, and a relatively smaller proportion of a blowing, foaming, and/or pore forming agent. Additionally, as indicated a greater or lesser portion of algae mass may also be included, such as incorporated into the PU, EVA, and/or other foam component. Specifically, as described above, examples of suitable foamable resins that may be employed may include one or more thermo setting resins such as the phenolaldehyde types, ureaaldehyde types, melamine-aldehyde types, and thermoplastic resins, such as cellulose ethers and esters, e.g., methyl cellulose, ethyl cellulose, cellulose acetate. Other polymers that may be employed include homo-polymers and interpolymers derived from monomers containing the vinylidene group CH=C such as vinyl chloride, vinyl bromide; vinylidene chloride; olefins, e.g., ethylene, isobutylene; vinyl esters of carboxylic acids, e.g., vinyl acetate, vinyl propionate, vinyl benzoate; vinyl ethers, e.g., vinyl methyl ether, vinyl isobutyl ether; unsaturated carboxylic acid and derivatives thereof, e.g., acrylic acid, acrylic acid esters, acrylamide, acrylonitrile, methacrylic acid and its corresponding derivatives; vinyl aromatic compounds, e.g., styrene vinyl toluene, alphamethylstyrene, o-chlorostyrene, 2,5-dichlorostyrene and interpolymers of such vinylidene monomers with alpha, betaunsaturated polycarboxylic acids and their derivatives, e.g., maleic anhydride, diethyl maleate, dibutyl fumarate, diallyl maleate, and the like.

However, in various instances, liquid foamable polyurethane (PU) and/or flexible ethylene vinyl acetate (EVA) compositions are particularly useful resins, such as for use in the practice of the present disclosure. Specifically, the polyurethane composition may contain one or more of an organic polyisocyanate, a polyalkylene ether polyhydric alcohol, water and a gas, such as carbon dioxide, and/or a c-hloro-fluorohydrocarbon, such as dichlorofluromethane, trichloro-fluoromethane, and the like. Further, suitable foaming or blowing agents for the foamable resin compositions are well known in the art and the selection of the particular foaming or blowing agent to be employed may be dictated at least in part by the particular resin in which it is to be incorporated. In some cases the foaming agent may be generated in situ, as for example in the preparation of polyurethane foams by reacting polyesters with polyisocyanates. When using polyurethane compositions that do not generate the foaming agent in situ, numerous known blowing agents may be incorporated with the composition, e.g., the chloro-fluoro carbons mentioned above. The cover for the foam cushion or cushioned article can be any suitable covering material ordinarily used in upholstering furniture and covering ornamental pillows and the like, such as woven woolen fabrics, woven nylon fabrics, or fabrics woven from other various synthetic fibers as well as such materials as leather and the like.

Further, in another aspect, this disclosure is directed generally to a process for the manufacture of shoe components, such as soles, midsoles, and/or the insoles of shoes, such as shoe components that include or are otherwise comprised of foam, e.g., PU or EVA foam. Specifically, in particular embodiments, methods for making insoles or other shoe inserts are provided. For instance, the present shoe insert may be a form of cushioning device that is adapted to be inserted or otherwise fit within a shoe, e.g., a running shoe or sneaker, which may be configured so as to reduce the impact of a foot hitting a surface, e.g., the ground while running or walking, thereby absorbing and/or attenuating shock to the foot.

Particularly, shoe inserts may be comprised of one or a multiplicity of layers. For instance, in some instances, a base layer, a foam layer, and/or a fabric layer, e.g., an algae-derived fabric layer, may be provided. Specifically, a base layer of a relatively resilient material, and/or a foam layer, e.g., disposed over the base layer, and/or a fabric layer disposed over the foam layer may be included. Accordingly, the method may include integrally forming the base layer, the foam layer, and the fabric into a tri-laminate sheet. In various instances, a support layer may be disposed at least a heel area, which support layer may be constructed of a rigid material, such as of higher density than that of the laminate. An adhesive, glue, or other attachment mechanism may be provided and employed for attaching and forming the tri-laminate with the support layer.

More particularly, in other instances, the method for making a shoe insert may include the steps of: providing a foam layer and/or providing a fabric layer; heating the foam layer; joining the foam and fabric layers; providing a base layer, e.g., a base layer having a density that is the same, greater, or a lesser density as to the foam layer; and heating at least one of the base layer and foam layer so as to couple the base layer with the foam layer so as to form a dual or trilaminate.

The methods may further include providing a pre-formed support member, such as an arch support and/or heel member, which members may have a density substantially the same, or less, or greater than the density of the foam layer.

In particular instances, the support member may be formed of a compressed foam material so as to obtain greater density, and thus greater rigidity in comparison to that of the foam layer. Additionally, a heat and/or pressure reactivatable adhesive may be applied between the support and/or heel member and the laminate. A molding pressure may then be applied to the composition so as to cause the forming and/or shaping of the tri-laminate into the support and/or heel member so as to form an integral one-piece shoe insert, with the pre-formed heel member forming a rear portion and/or the support member forming a mid-portion of the bottom surface of the finished shoe insert, e.g., at the mid and/or heel area thereof, and the base layer forming the bottom surface of the finished shoe insert at the forward area thereof.

It is to be noted, however, that a support and/or heel member need not be included, and in some instances, one or more of the laminate components may be excluded or other laminate layers added. It is further to be noted that, in certain embodiments, the foam layer may be more flexible and/or cushioning, e.g., having a greater duometer, than the base layer, which in turn may be more flexible and/or cushioning, e.g., having a greater duometer, than the support member. Hence, the more flexible foam and base layers may be relatively resilient and conform in shape to the desired shoe size and configuration, whereas the support layer(s) may be relatively more rigid.

Further, as indicated, the foam layer and/or one or more of the support layers may be constructed of a PU and/or EVA foam material. Particularly, the support layer may be of a denser foam thus making the support layer more rigid. Hence, in various embodiments, the foam layer may have a density of about 2 or about 3 or about 5 to about 10 lbs. per cubic ft. or more, such as a density in the range of between about 4-6 lbs. per cubic ft. Additionally, the foam layer may have thickness of $\frac{1}{8}$"+ or −5%, such as in a range of thickness of about $\frac{3}{32}$"-$\frac{5}{32}$". Likewise, the base layer may also have a density of about 2 or about 3 or about 5 to about 10 lbs. per cubic ft. or more, such as a density in the range of between about 4-6 lbs. per cubic ft. In certain embodiments, the base layer may be a cross-linked polyethylene, a PU, and/or an EVA foam. The thickness of the base layer may be on the order of about $\frac{5}{16}$"+ or −10%. However, in various instances, the thickness of the base layer may range from about $\frac{1}{4}$" or less to about $\frac{7}{16}$" in thickness. With regard to the support layer, which may be formed primarily at the arch and/or heel areas of the insert, may also be made of a PU and/or EVA foam. However, the support layer may be made by being compressed so that the final density is on the order of 22-23 lbs. per cubic ft. The fabric layer may be constructed of any suitable material, for example, cotton, polyester, or a polypropylene knit.

In various instances, the material and foam layers may be laminated together by a flame lamination technique that employs an open flame which is directed to the foam layer. The open flame generates sufficient heat on the surface to cause melting of the flat sheet foam layer. Once melted, the fabric layer may be joined therewith and the two sandwiched together layers may be run between chilled rollers, while sufficient pressure is applied between the rollers so that the two layers are joined together. At this point in the process, these layers are still maintained in a flat sheet form. These integrated layers may then next joined, also by flame lamination, to the base layer. The previously integrated material and foam layers may be joined to the support layer and these multi-laminated layers may then be run between chilled rollers. At this stage of the process, these layers are still in flat sheet form. The layers thus laminated to this point are then ready for molding. This may be performed by heating the laminated layers to a molding temperature of approximately 250° F., such as for a period of about 1 to about 5 minutes or more, e.g., about 225 seconds. This heats the previously laminated layers sufficiently to permit them to be inserted into a mold.

The mold may be comprised of a plurality of pieces, which pieces may be composed of a heat resistant aluminum. The laminated layers may be placed in the preshaped mold along with a preformed arch and/or heel support member and the mold is closed. An adhesive, such as a chlorinated rubber base adhesive, may be added to one or more of the layers, which adhesive may be heat and/or pressure reactivatable. During this molding step, the adhesive is activated at substantially the same time that the shaping of the tri-laminate along with the support layers occur. The appropriate shaping is accomplished by the mold press. The molding occurs under a pressure, such as about 85 lbs. psi, more or less. In various instances, the mold may be a water cooled mold, such as cooled by the passage of water therethrough so as to maintain the temperature at approximately 40° F. The mold may be maintained in its press-mold state for approximately 50-65 seconds.

Accordingly, the tri-laminate material is inserted into the mold in a hot condition, is further heated to proper molding temperatures, and is then brought to a colder temperature by virtue of the cooling of the mold. During this process, the adhesive is activated by virtue of contact with the preheated tri-laminate and/or by means of pressure applied during the molding operation. Hence, the molding step causes the simultaneous shaping of the insert along with the affixing of the support layers to the previously formed tri-laminate.

Additionally, as indicated above, in one aspect an algae derived textile material and a method of making the same, as well as products produced employing the so produced fabrics are provided. Accordingly, in some implementations, the fabrics may be formed of algae-derived antimicrobial fiber substrates. The fiber may be synthetic, but can also be formed as a cellulosic (e.g., cotton). In various iterations, an algae-derived antimicrobial fiber substrate can be made to have identical properties and characteristics of nylon-6 of nylon 6-6 polymer or the like, and yet contain antimicrobial substances.

An advantage of using the methods described herein is that the algal-derived antimicrobial compounds generally will not clump, separate out of solution, or otherwise agglomerate to cause undesirable manufacturing problems commonly experienced with other types of antimicrobial compounds. As a result, the methods avoid clogging of extrusion equipment such as spinneret heads during manufacture of synthetic fibers and other textiles. Furthermore, using the methods herein, the surface of the algae-derived antimicrobial compounds can be functionalized to bind to polymers and/or cellulose based materials among others, thereby permitting control of the properties of the textile as well as the associated inherent algae-derived antimicrobial/ antifungal agent, regardless of the composition of the textile.

As indicated above, Algae refer to aquatic organisms that carry on photosynthesis, and are typically part of a fresh water system's phytoplankton. They are like plants, having chloroplasts, and their cells are strengthened by a cell wall. Algae may be classified by pigmentation, such as green Chlorophyta, brown Phaeaphyta, golden brown Chrysphyta, and red Rhodophyta. Any suitable algae may be employed to make the algae derived fibers described herein. Such algae are typically plantlike protists, that can be eukaryotic, unicellular, or multicellular organisms.

Specifically, any of various species of red algae, brown algae, and brown seaweed (marine microalgae), as explained above, are known to contain a high level of sulfated polysaccharides with inherent antimicrobial properties, and can be used in various implementations of any of the subject matter described herein. An example of a beneficial algal-derived sulfated polysaccharide for use in some implementations is the dried fucoidan and/or Oolitic aragonite powder described herein, which may include the extracts and/or metabolites, or reactants thereof. For instance, fucoidan may designate a group of certain fucose-containing sulfated polysaccharides (FCSPs), which may not be found in terrestrial plants. As indicated above, it has a backbone built of (1→3)-linked α-l-fucopyranosyl or of alternating (1→3)- and (1→4)-linked α-l-fucopyranosyl residues, but also include sulfated galactofucans with backbones built of (1→6)-β-d-galacto- and/or (1→2)-β-d-mannopyranosyl units with fucose or fucooligosaccharide branching, and/or glucuronic acid, xylose or glucose substitutions.

There are at least two particular forms of fucoidan that are particularly useful herein: F-fucoidan, which is about >95% composed of sulfated esters of fucose, and U-fucoidan, which is approximately 20% glucuronic acid. An additional non-limiting example of a suitable algal-derived antimicrobial compound of some implementations is sulfated galactan, which has been shown to be effective at inhibiting human bactericidal pathogens such as *Staphylococcus aureus, Salmonella enteretidis, P. aeruginosa, Enterococcus faecalis, Bacillus subtilis, Micrococcus luteus* and *Candida glabnata*. Any suitable sulfated polysaccharide, reactant, metabolite, or derivative therefrom may be derived from freshwater algae or seaweed and may be utilized for incorporating the antimicrobial component into the flexible foams of the present disclosure.

Hence, in some implementations, as generally illustrated in FIG. 1, methods are provided for manufacturing textiles having desirable antimicrobial and/or antifungal properties. For example, such methods may include, but are not limited to, the following steps:

At 102, providing a natural algae-derived antimicrobial powder comprising one or more sulfated polysaccharides and/or a metabolite thereof having antimicrobial and/or antifungal activity, the one or more sulfated polysaccharides and/or metabolites having at least one preselected average particle size range and at least one preselected particle size distribution within the at least one particle size range; at 104 mixing the powder comprising the one or more sulfated polysaccharides with a liquid comprising a reactive and/or block copolymer compatibilizer, such as using a dispersive mixer to form a liquefied sulfated polysaccharide/compatibilizer slurry; at 106 pumping the liquefied sulfated polysaccharide/compatibilizer slurry into a polymer fed extruder, such as a twin screw extruder, and at 108 extruding pellets of sulfated polysaccharide/polymer composite, which composite is hereinafter referred to as a "masterbatch"; at 110 mixing the masterbatch with a base polymer to form a letdown polymer, and at 112 melt spinning the letdown polymer to obtain synthetic fibers; and optionally, weaving the synthetic fibers into a fabric substrate to yield desirable antimicrobial and/or antifungal characteristics that persist through a predetermined minimum number of launderings, for example, at least about 25 standard home launderings.

Figure 2:
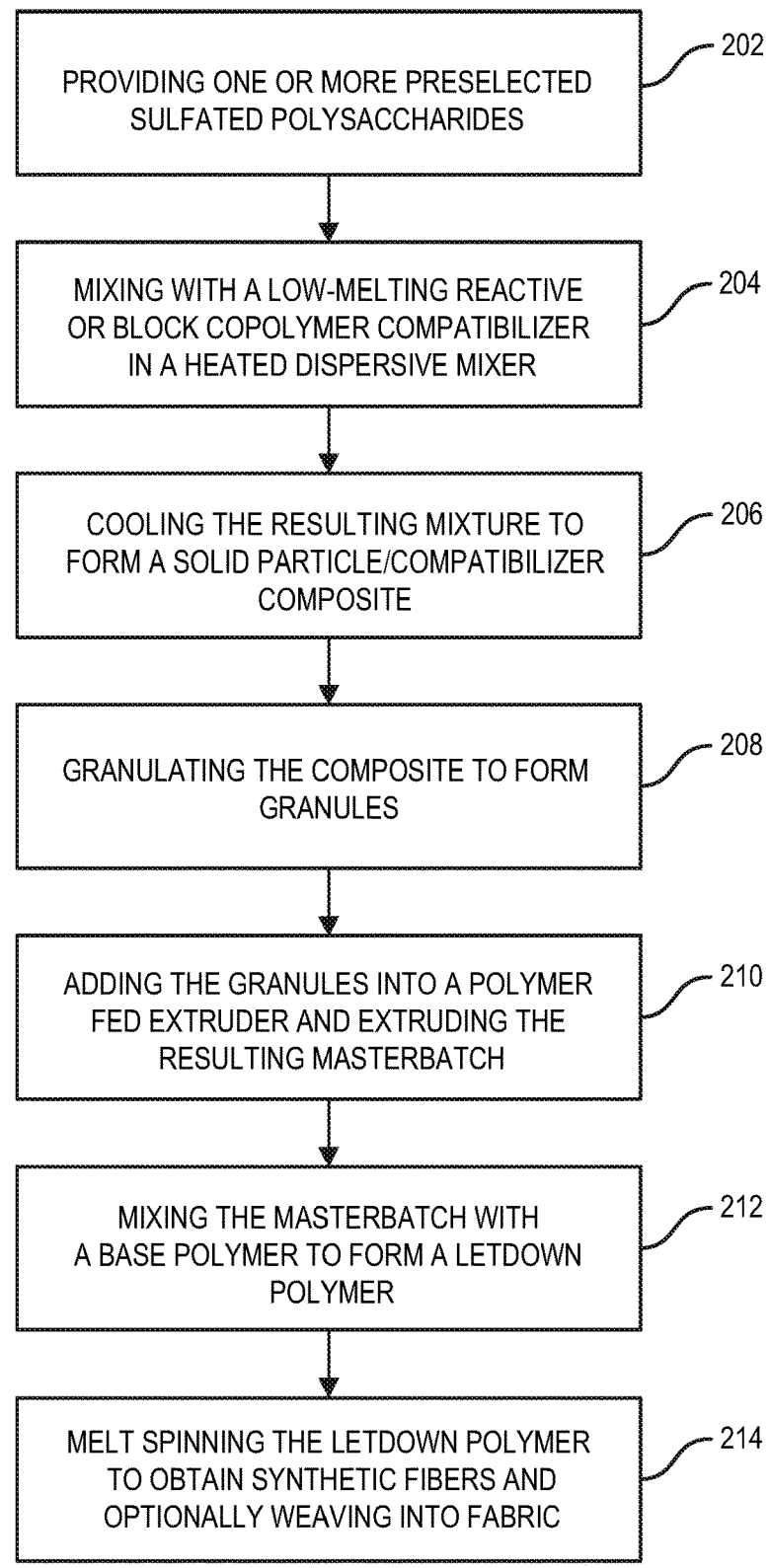
FIG. 2 is a flowchart of a method for manufacturing textiles having desirable antimicrobial and/or antifungal properties utilizing relatively low melt polymers.

In other implementations, as generally illustrated in FIG. 2, a method includes utilizing relatively low melt polymers, for example, polymers melting below about 500 degrees Fahrenheit. Accordingly, in another example below about 400 degrees Fahrenheit, the methods may include the steps of:

At 202 providing one or more sulfated polysaccharide powders comprising a plurality of particles having antimicrobial and/or antifungal activity where the plurality of particles has at least one preselected average particle size range and at least one preselected particle size distribution within the at least one particle size range; at 204 mixing the sulfated polysaccharide powder with a low-melting reactive or block copolymer compatibilizer in a heated dispersive mixer; at 206 cooling the resulting mixture to form a solid particle/compatibilizer composite; at 208 granulating the particle/compatibilizer composite to form granules; mixing particle/compatibilizer granules into a polymer fed extruder such as a twin screw extruder, and at 210 extruding pellets of the resulting particle/polymer composite, also referred to as a "masterbatch"; at 212 mixing the masterbatch with a base polymer to form a letdown polymer, and at 214 melt spinning the letdown polymer to obtain synthetic fibers; and optionally, weaving the synthetic fibers into a fabric substrate to yield desirable antimicrobial and/or antifungal and/or flame retardant characteristics that persist through a predetermined number of launderings, for example at least about 25 or about 100 or about 250 or about 500 or about 1,000 standard home launderings or more.

Figure 3:
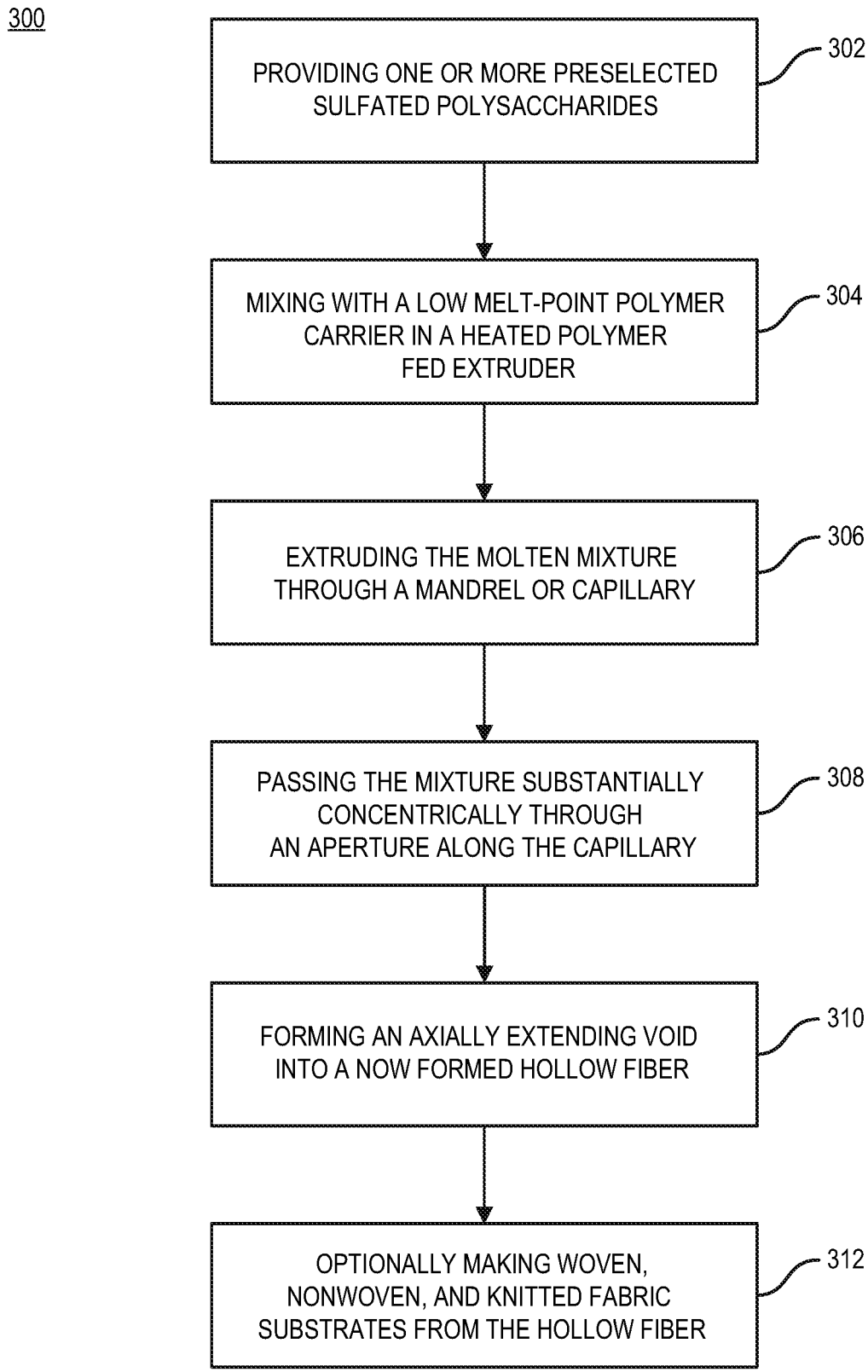
FIG. 3 is a flowchart of a method for manufacturing textiles utilizing relatively low melt carrier polymers to form pure hollow and mock-hollow fibers.

In yet other implementations, as generally illustrated in FIG. 3, utilizing relatively low melt carrier polymers for example, polymers melting below about 400 degrees Fahrenheit, and in another example below about 200 degrees Fahrenheit to form pure hollow and mock-hollow fibers, the methods may include the steps of:

At 302 providing a powder comprising one or more sulfated polysaccharides having antimicrobial and/or antifungal and/or flame retardant activity with the one or more sulfated polysaccharides or metabolites thereof having at least one preselected average particle size range and at least one preselected particle size distribution within the at least one particle size range; at 304 adding the powder comprising the one or more sulfated polysaccharides with a low melt-point polymer carrier into a heated polymer fed extruder, and at 306 extruding the molten sulfated polysaccharide/polymer mixture through a mandrel or capillary, at 308, passing substantially concentrically through an aperture where it is guided in an annular distribution along the capillary. The capillary facilitates formation of the axially extending void into the now formed hollow fiber, at 310; and optionally, at 312, making both woven and nonwoven fabric substrates as well as knitted fabric substrates from the hollow fiber to yield desirable antimicrobial and/or antifungal characteristics that persist through a predetermined minimum number of launderings, for example, at least about 25 standard home launderings.

Figure 4:
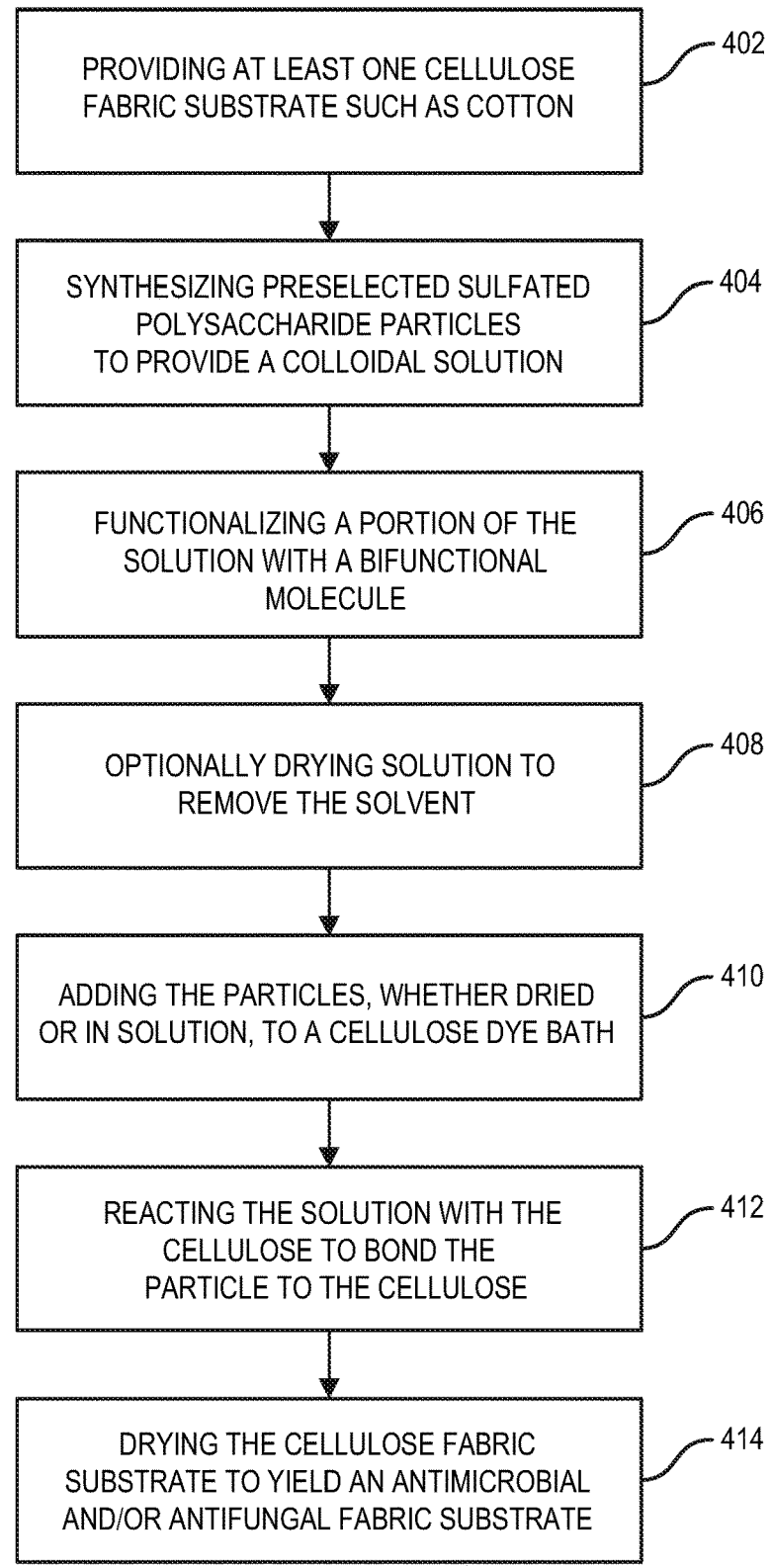
FIG. 4 is a flowchart of a method for imparting wash-durable antimicrobial and/or antifungal characteristics on cellulose-based fabric substrates.

In yet other implementations, as generally illustrated in FIG. 4, methods are provided for imparting wash-durable antimicrobial and/or antifungal and/or flame-retardant characteristics on cellulose-based fabric substrates. In one embodiment, the method comprises the following steps:

At 402 providing at least one cellulose-based fabric substrate (e.g., cotton); at 404 synthesizing sulfated polysaccharide particles to provide a colloidal solution of particles having antimicrobial and/or antifungal activity, the plurality of particles having at least one preselected average particle size range and at least one preselected particle size distribution within the at least one particle size range; at 406 functionalizing at least a portion of the particles with a bifunctional molecule, selected to include at least one functional group for capping the molecule and at least one second functional group, such as a cellulose dye group, selected to react with at least one selected functional group on the cellulose, to form a functionalized particle in a colloidal solution; optionally, at 408, using drying methods to remove the solvent from the functionalized particle colloidal solution; at 410 adding the particles, whether dried or in solution, to a cellulose dye bath; at 412 reacting the cellulose dye group with the cellulose to bond the functionalized particle to the cellulose; and at 414 drying the cellulose fabric substrate, such as by pad drying, to yield an antimicrobial and/or antifungal fabric substrate having desirable antimicrobial and/or antifungal and/or flame retardant characteristics that persist through a predetermined number of launderings, for example at least about 25 standard home launderings.

Figure 5:
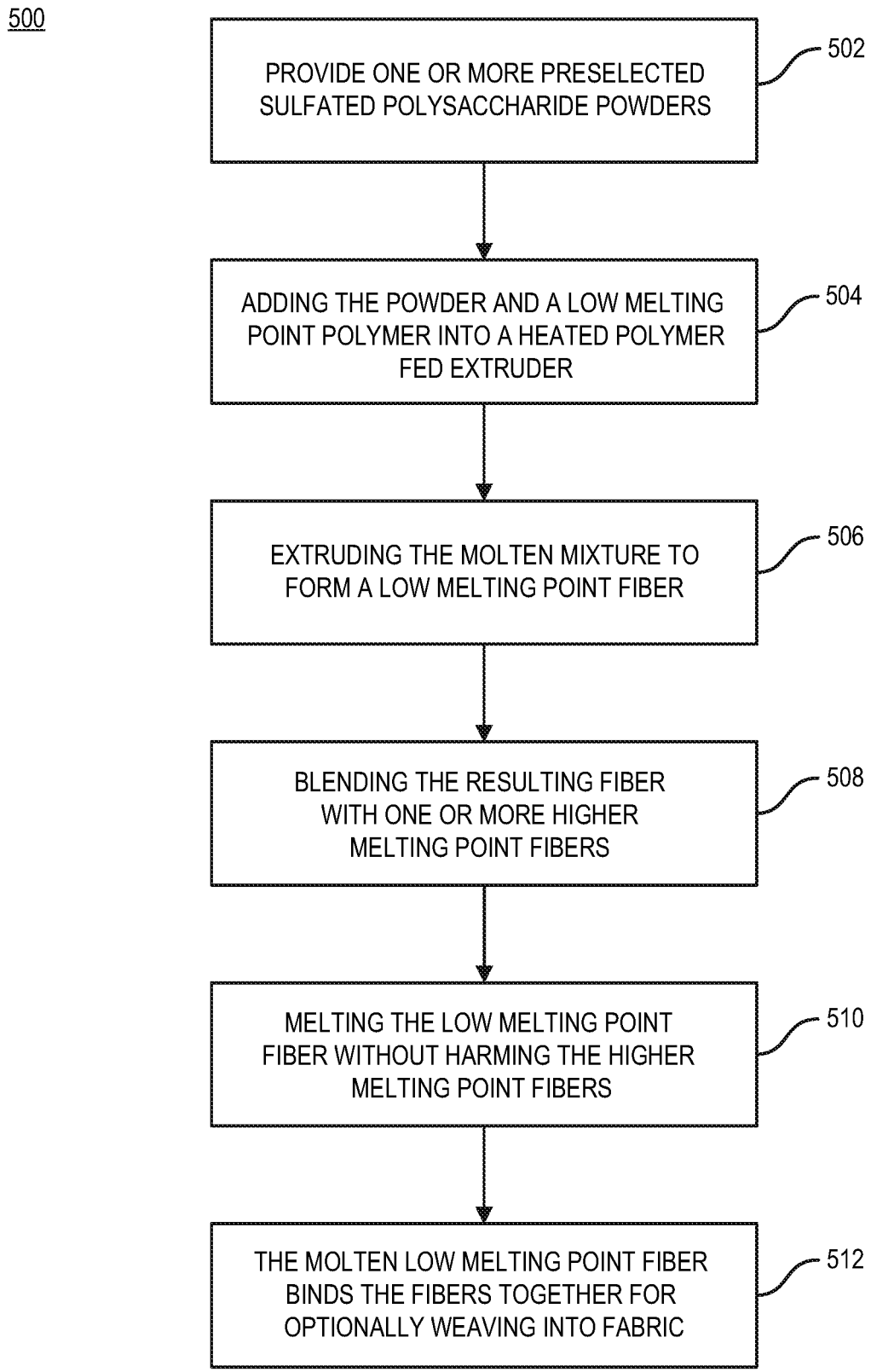
FIG. 5 is a flowchart of a method for manufacturing textiles utilizing relatively low melting point polymers to form fibers.

Still in other implementations, as generally illustrated in FIG. 5, utilizing relatively low melting point polymers for example, polymers melting below about 300 degrees Fahrenheit, and in another example below about 200 degrees Fahrenheit to form fibers, the methods may include the steps of:

At 502 providing a powder comprising one or more sulfated polysaccharides, metabolite thereof, having antimicrobial and/or antifungal and/or flame retardant activity with the one or more sulfated polysaccharides and/or metabolites thereof having at least one preselected average particle size range and at least one preselected particle size distribution within the at least one particle size range; at 504 adding the powder comprising the one or more sulfated polysaccharides with a low melting point polymer into a heated polymer fed extruder, and at 506 extruding the molten sulfated polysaccharide/polymer mixture to form a fiber. At 508 the newly formed fiber can be blended with other natural and/or synthetic fibers that are not affected by the low melting point polymer in order to achieve any number of desired blended fiber outcomes. The low melting point fiber is then activated by sufficiently heating it at 510. This melts the low melting point fibers without harming the other higher melting point fibers with which it has been blended. The low melting point fiber melts and wicks along the other blended higher melting point fibers to bind the blended fibers together thereby leaving behind the encapsulated antimicrobials in the remaining fibers, at 512. This yields desirable antimicrobial and/or antifungal and/or flame retardant characteristics that persist through a predetermined minimum number of launderings, for example, at least about 25 standard home launderings.

Figure 6:
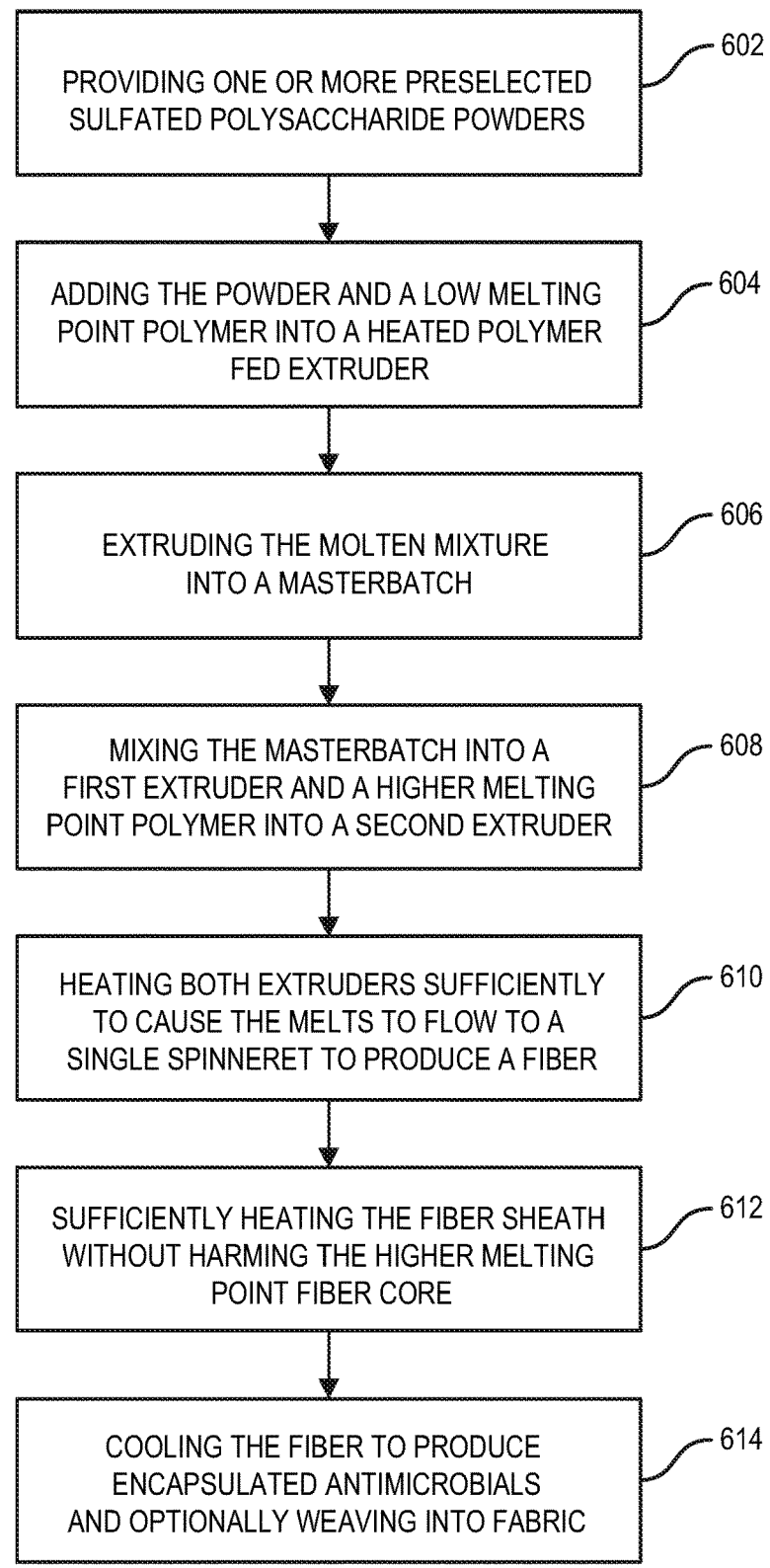
FIG. 6 is a flowchart of a method for manufacturing textiles utilizing relatively low melting point polymers to form synthetic fibers.

Still in other implementations, as generally illustrated in FIG. 6, utilizing relatively low melting point polymers for example, polymers melting below about 300 degrees Fahrenheit, and in another example below about 200 degrees Fahrenheit to form synthetic fibers, the methods may include the steps of:

At 602 providing one or more sulfated polysaccharide (or metabolites thereof) powders comprising a plurality of particles having antimicrobial and/or antifungal and/or flame retardant activity where the plurality of particles has at least one preselected average particle size range and at least one preselected particle size distribution within the at least one particle size range; at 604 adding or mixing the sulfated polysaccharide powder with a low melting point polymer into a heated polymer fed extruder, and at 606 extruding the molten sulfated polysaccharide/polymer (and/or metabolites thereof) mixture into pellets of sulfated polysaccharide/polymer composite, which composite is hereinafter referred to as a "masterbatch"; at 608 mixing the masterbatch into a first extruder and a higher melting point polymer into a second extruder. At 610 both are heated sufficiently so that the extruders cause the melts to flow to a single spinneret in which the higher melting point polymer is made into the core and the masterbatch is made into the sheath. In the fiber state, or in a more finished yarn state, or in an even further finished woven or nonwoven fabric state, the fiber is sufficiently heated, at 612. The heat melts the fiber sheath without harming the higher melting point fiber core; thereby leaving behind the encapsulated antimicrobials in the remaining fibers, at 614, as the fiber is cooled. This yields desirable antimicrobial and/or antifungal and/or flame retardant characteristics that persist through a predetermined minimum number of launderings, for example, at least about 25 standard home launderings.

In accordance with some implementations, a useful particle size of the sulfated polysaccaride is a mean of no more than 5 microns with a distribution of no more than 8 microns on the upper/larger site. Anything larger than that, in some implementations, can clog the fiber extrusion screens. Additionally, if the particle size is too large it can ruin the mechanical properties of the fiber. The moisture content of the sulfated polysaccharide and/or metabolite powder may be in the range of between 0% and 10%, such as between 2% and 5%. Low moisture content is useful because it ensures the powder will not cake and agglomerate in the polymer and fiber extrusion processes.

Polyethylene Terepthalate Glycol (PETG) may be used as one or more of the non-limiting examples of a low melting point polymers and/or carriers for a wide variety of applications. PETG is an amorphous binder polymer that can be made into an amorphous binder fiber. The fiber can be blended into yarns with other fibers to form woven fabrics, as well as knits and non-woven fabrics. It has two characteristics of particular interest: (1) excellent wetting and (2) low melting temperature (which can be controlled between 90° C. and 160° C.). It is used in the presently described methods and products as a carrier for anti-microbial additives and/or optionally to carry pigments.

In one implementation, the total loading level of the sulfated polysaccharide in a given antimicrobial fiber substrate formulation may be between about 0.1% or about 1% and about 20% or about 25%, for instance, between about 2% or about 5% and about 10% or about 15%, including about 6% to about 8%.

Accordingly, in one aspect, a method for producing an algae derived fiber is presented wherein the method includes one or more of the following steps: providing a natural algae-derived antimicrobial powder having one or more sulfated polysaccharides, or a reactant or metabolite thereof, such as where the algae derived powder has antimicrobial and/or antifungal and/or antiviral and/or flame retardant activity. In such an instance, the one or more of sulfated polysaccharides and/or metabolites and/or reactants thereof may be size distributed or otherwise preselected so as to have at least one preselected average particle size range, and may be further preselected to have at least one preselected particle size distribution within the at least one particle size range.

The method may additionally include mixing the powder comprising the one or more sulfated polysaccharides, metabolites, and/or reactants thereof with a liquid having a reactive and/or block copolymer compatibilizer, such as using a dispersive or other suitable mixer to form a liquefied sulfated polysaccharide, metabolite, reactant compatibilizer slurry. Once produced, the slurry mixture may then be pumped into a polymer fed extruder, such as a twin screw extruder, and pellets of the sulfated polysaccharide mixture/polymer composite may be extruded to form a masterbatch (as described above). The masterbatch may be mixed with a base polymer to form a letdown polymer, and the letdown polymer may then be subjected to melt spinning or other such processes to obtain the synthetic fibers.

Once the algae derived fibers are produced, they may then be weaved into a fabric substrate to yield desirable antimicrobial and/or antifungal and/or antiviral and/or flame retardant characteristics that persist through a number of launderings. The woven fabric structure may then be processed or otherwise employed to make any suitable article of manufacturing wherein woven materials are employed, such as for the production of clothing, such as: shirts and T-shirts, suits, jackets, pants, dresses, skirts, socks, undergarments, hats, and the like; laundry, including: sheets, pillow cases, blankets, bed spreads, bedding materials, and the like; woven household items, including drapes, curtains, carpets, rugs, artwork, skirting, clothes, table cloths, towels, wall paper, paper towels, and the like; upholstery, including sofas, chairs, beds, seatings within automobiles, and the like; as well as foul weather gear and flame retardant safety gear and clothing, and the like.

In another embodiment, a method may be provided wherein the method includes providing one or more sulfated polysaccharide powders, which may include a metabolite and/or reactant thereof, wherein the powder may include a plurality of particles having antimicrobial and/or antifungal and/or antiviral and/or flame retardant activity where the plurality of particles may, in various instances, has one or more preselected average particle size range and may have a preselected particle size distribution within the at least one particle size range. Such methods may include mixing the sulfated polysaccharide powder with a low-melting reactive or block copolymer compatibilizer, such as in a heated dispersive mixer, which may then be cooled. The cooled solid particle/compatibilizer composite may then be subjected to granulating the particle/compatibilizer composite to form granules that may be fed into an extruder such as a twin screw extruder, and pellets of the resulting particle/polymer composite may be extruded to form a masterbatch. The masterbatch may be mixed with a base polymer to form a letdown polymer, and then be subjected to melt spinning to obtain synthetic fibers that may be woven into synthetic fibers and into a fabric substrate to yield desirable antimicrobial and/or antifungal and/or antiviral and/or fire retardant characteristics that persist through a number of launderings, for example at least about 25, 50, 75, 100, 500, 1000 or more standard home launderings.

In a further embodiment, a method is presented wherein the method may include one or more of the following steps: providing at least one cellulose-based fabric substrate; synthesizing sulfated polysaccharide (and/or metabolite and/or reactants thereof) particles to provide a colloidal solution of particles having antimicrobial and/or antifungal and/or antiviral, and/or flame-retardant activity, such as where a plurality of the particles may have at least one preselected average particle size range and at least one preselected particle size distribution within the at least one particle size range. In certain instances, the method may further include functionalizing at least a portion of the particles with a bifunctional molecule, selected to include at least one functional group for capping the molecule and may additionally include at least one second functional group, such as a cellulose dye group, selected to react with at least one selected functional group on the cellulose, to form a functionalized particle in a colloidal solution. It is to be understood that in any of these embodiments, suitable dyes, pigments, and/or other coloring factors may be added to the mixtures and processes herein so as to give the woven substrates and fabrics a desired pantone and/or coloring. Once the colloidal solution is produced the functionalized particles may be dried so as to remove the solvent from the functionalized particle colloidal solution. Further, if desired the dried colloidal solution and/or dried functionalized particles may be added to a cellulose dye bath, where the cellulose dye group may be reacted with the cellulose to bond the functionalized particle to the cellulose; and the cellulose fabric substrate may then be dried to yield an antimicrobial and/or antifungal and/or anti-viral and/or anti-inflammatory fabric substrate having desirable antimicrobial and/or antifungal characteristics that persist through a number of launderings.

Although a few embodiments have been described in detail above, other modifications are possible. Other embodiments may be within the scope of the following claims.

The invention claimed is:

1. An algae-derived foam composition for use in the production of an article of manufacture, the algae-derived foam composition comprising:
   (a) a liquid carrier configured for forming a foamed material, the liquid carrier including ethylene vinyl acetate (EVA) having a vinyl acetate content in a range from 25% to 50% by weight of the EVA;
   (b) an algae biomass that includes protein incorporated into the liquid carrier within a loading range from about 0.1% to about 70% algae biomass by weight, wherein the algae biomass is provided as a dried algae powder having an average particle size of about 50 to 100 microns; and
   (c) a foaming ingredient in an amount sufficient for foaming the algae-derived foam composition to a density in a range from 1 to 400 kg/m$^3$.

2. The algae-derived foam composition according to claim 1 wherein the article of manufacture includes an open-celled or closed-celled polyurethane foam prepared from the algae-derived foam composition.

3. The algae-derived foam composition according to claim 1, wherein the article of manufacture includes a closed-celled thermoplastic foam prepared from the algae-derived foam composition.

4. The algae-derived foam composition according to claim 1, further comprising fucoidan powder from about 1% to about 5% by weight of the algae-derived foam composition.

5. The algae-derived foam composition according to claim 1, wherein the foaming ingredient includes a member selected from the group consisting of azodicarbamide blowing agents, organic surfactants, water, and combinations thereof.

6. The algae-derived foam composition according to claim 1, wherein the liquid carrier is a thermoplastic resin for use in thermoplastic foams.

7. The algae-derived foam composition according to claim 6, wherein the thermoplastic resin is a synthetic or a plant derived resin.

8. The algae-derived foam composition according to claim 1, wherein the liquid carrier further includes a member selected from the group consisting of polyethylene, polyethylene vinyl acetate, polystyrene, polylactic acid, polybutylene succinate, polypropylene, polyvinyl chloride, polybutylene adipate-co-terephthalate, thermoplastic starch, thermoplastic elastomers, polyesters, polyethylene terephthalate, plant proteins, cellulose acetate, and combinations thereof.

9. The algae-derived foam composition according to claim 1, wherein the liquid carrier further includes a compatibilizer, an additive or combinations thereof.

10. The algae-derived foam composition according to claim 9, wherein the compatibilizer or the additive is selected from the group consisting of reactive polymers, block copolymers, side chain-modified polymers, peroxides, stearates, zinc oxides, calcium carbonates, isocyanates, amine catalysts, organic surfactants and combinations thereof.

11. The algae-derived foam composition according to claim 1, wherein the liquid carrier is a polyol for use in polyurethane foam.

12. The algae-derived foam composition according to claim 1, further comprising from about 0.01% to 40% oolitic aragonite by weight of the algae-derived foam composition.

13. The algae-derived foam composition according to claim 1, wherein the article of manufacture includes a flexible foam prepared from the algae-derived foam composition.

14. The algae-derived foam composition according to claim 1, wherein the algae content of the algae-derived foam composition is between about 10% to 25% by weight.

15. The algae-derived foam composition according to claim 1, wherein the article of manufacture includes a semi-rigid foam prepared from the algae-derived foam composition.

* * * * *